Dec. 12, 1933.   H. R. BRAND   1,938,577
AUTOMATIC SALES SYSTEM
Filed June 27, 1928   21 Sheets-Sheet 1
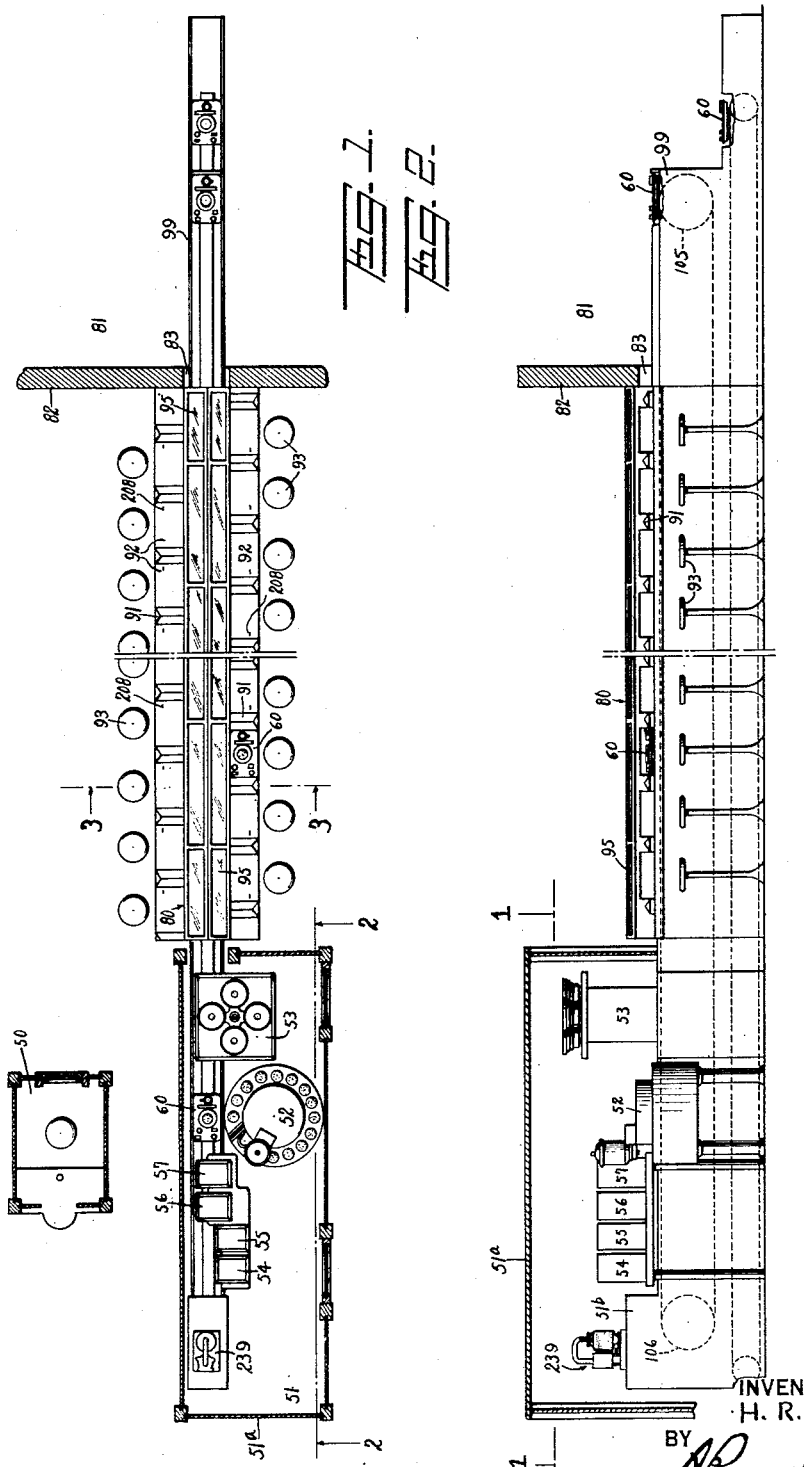
INVENTOR
H. R. Brand
BY
ATTORNEY Dec. 12, 1933.  H. R. BRAND  1,938,577
AUTOMATIC SALES SYSTEM
Filed June 27, 1928   21 Sheets-Sheet 2
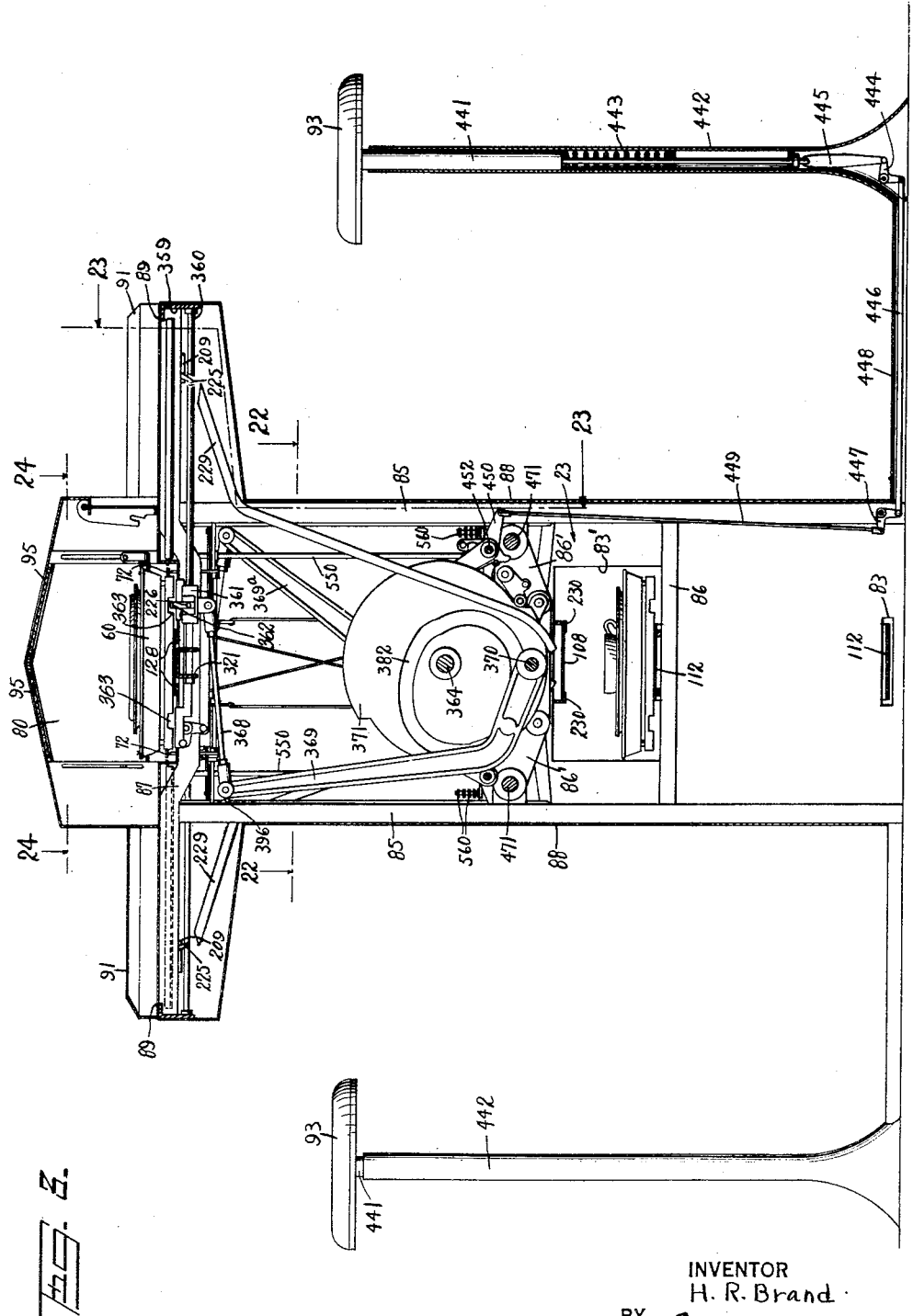
INVENTOR
H. R. Brand
BY
ATTORNEY Dec. 12, 1933.                H. R. BRAND                  1,938,577
                         AUTOMATIC SALES SYSTEM
                         Filed June 27, 1928          21 Sheets-Sheet 3
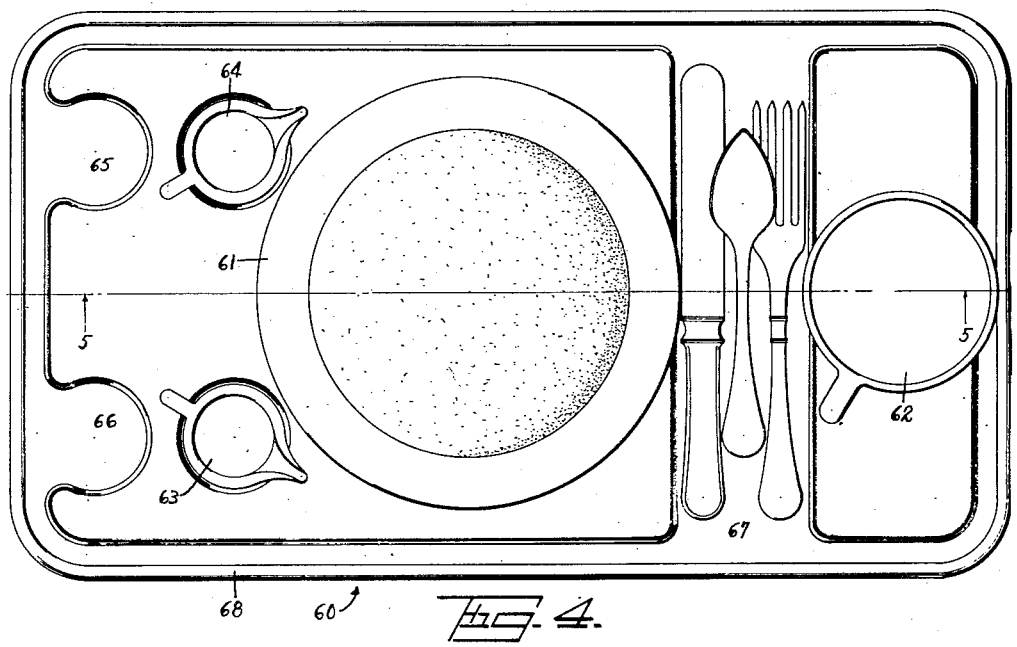
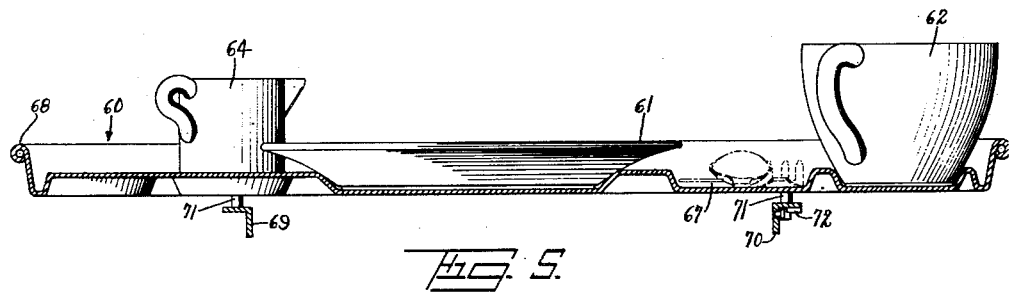
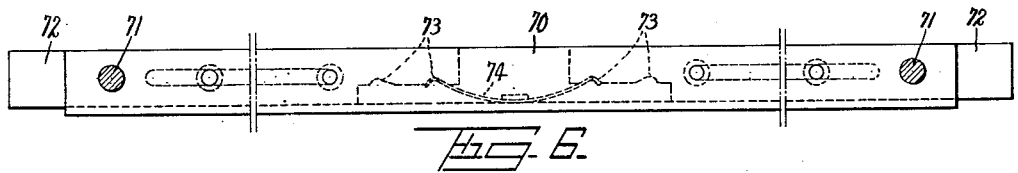
INVENTOR
H. R. Brand
BY
ATTORNEY

Dec. 12, 1933.                 H. R. BRAND                 1,938,577
AUTOMATIC SALES SYSTEM
Filed June 27, 1928                 21 Sheets-Sheet 4
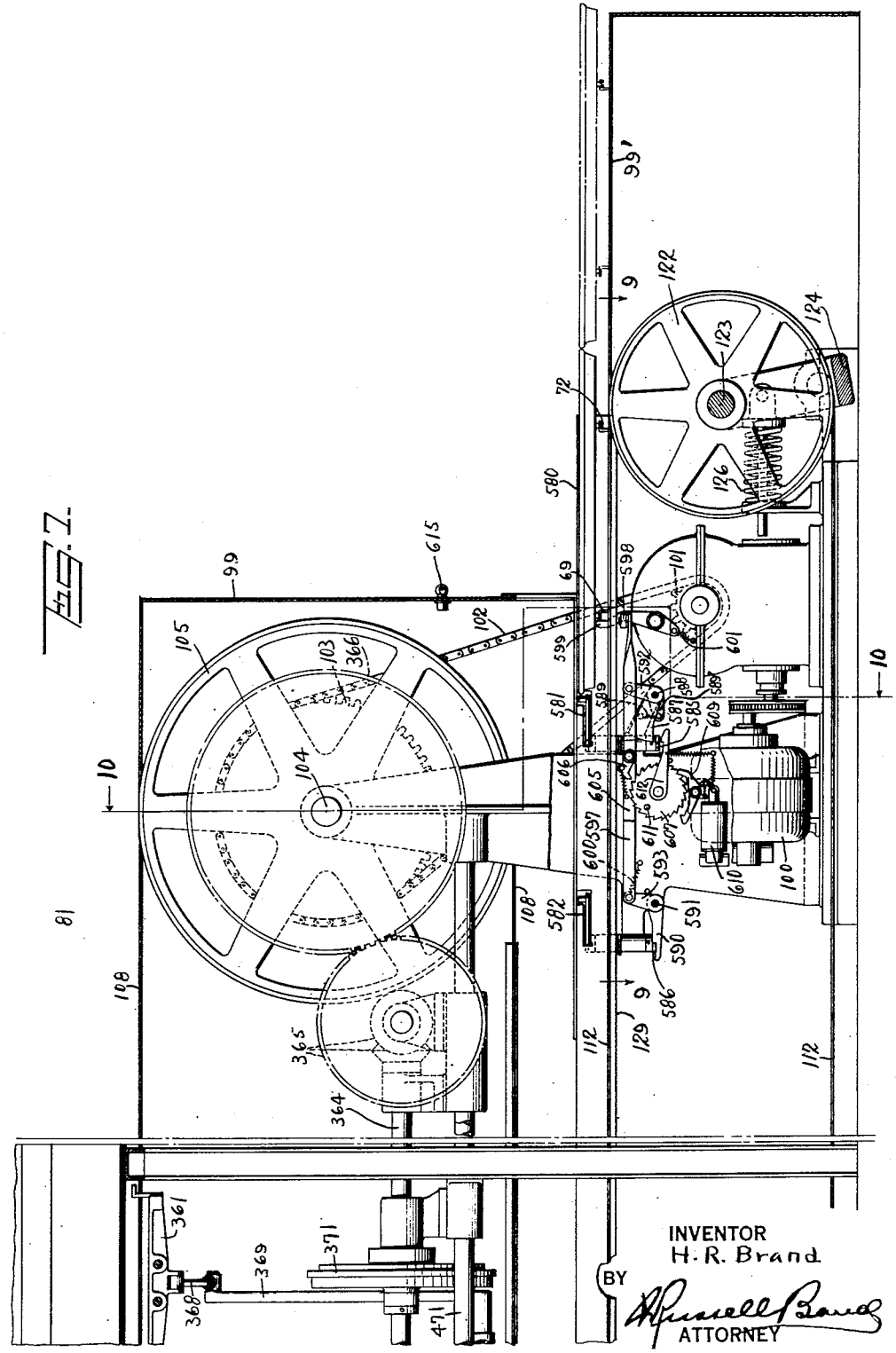
INVENTOR
H. R. Brand
BY
ATTORNEY

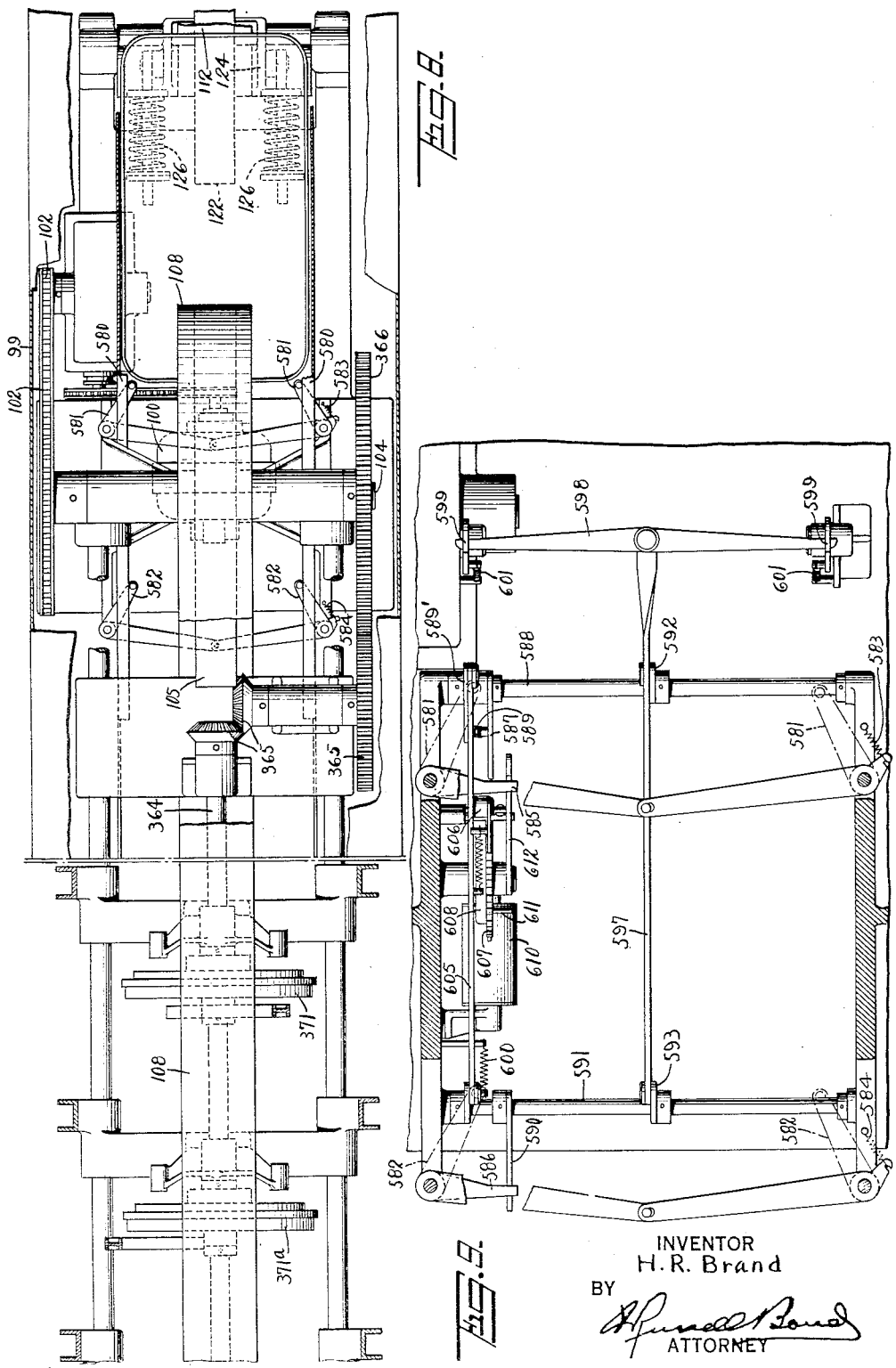

Dec. 12, 1933.                H. R. BRAND                1,938,577
                         AUTOMATIC SALES SYSTEM
                      Filed June 27, 1928        21 Sheets-Sheet 6
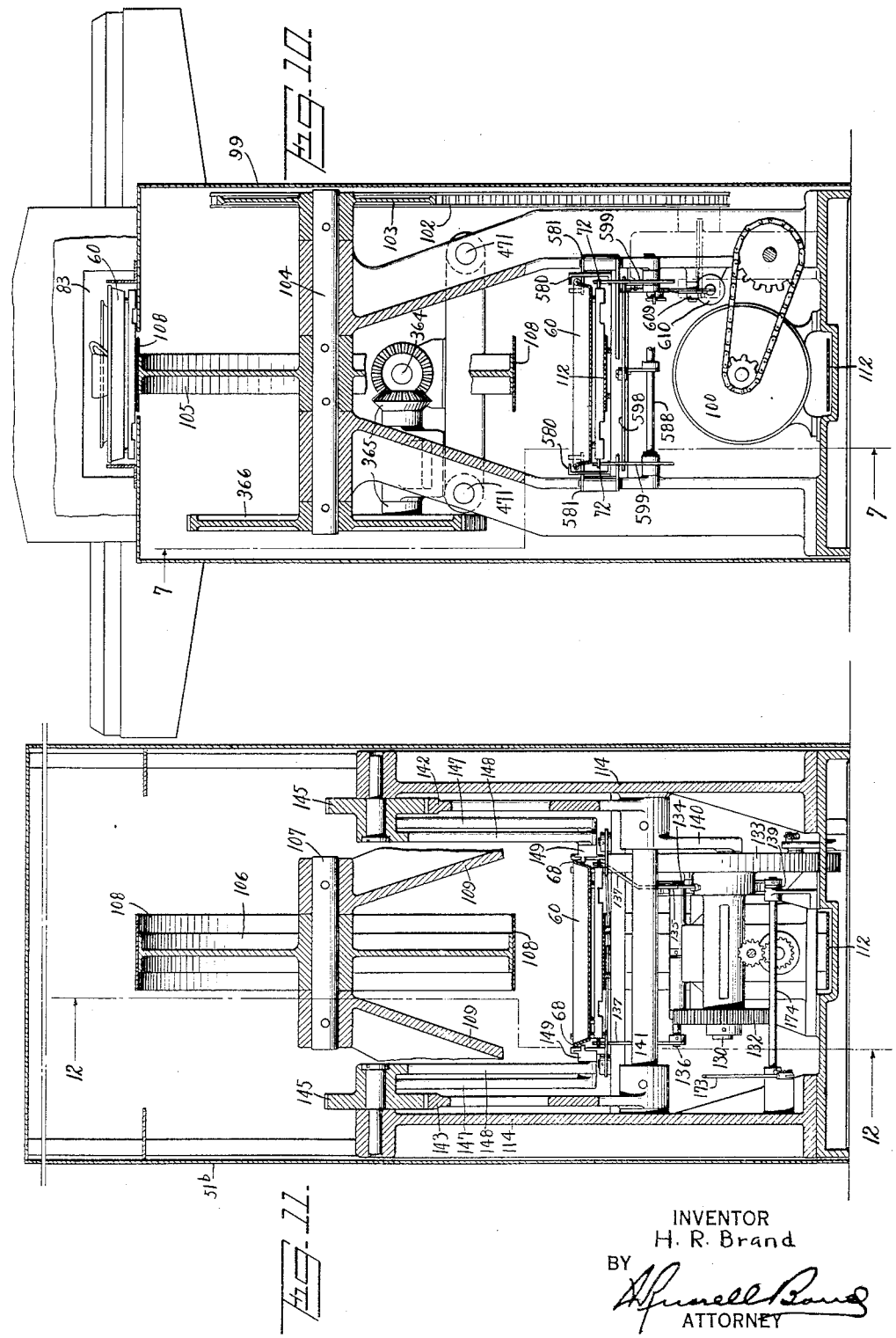
INVENTOR
H. R. Brand
BY
ATTORNEY

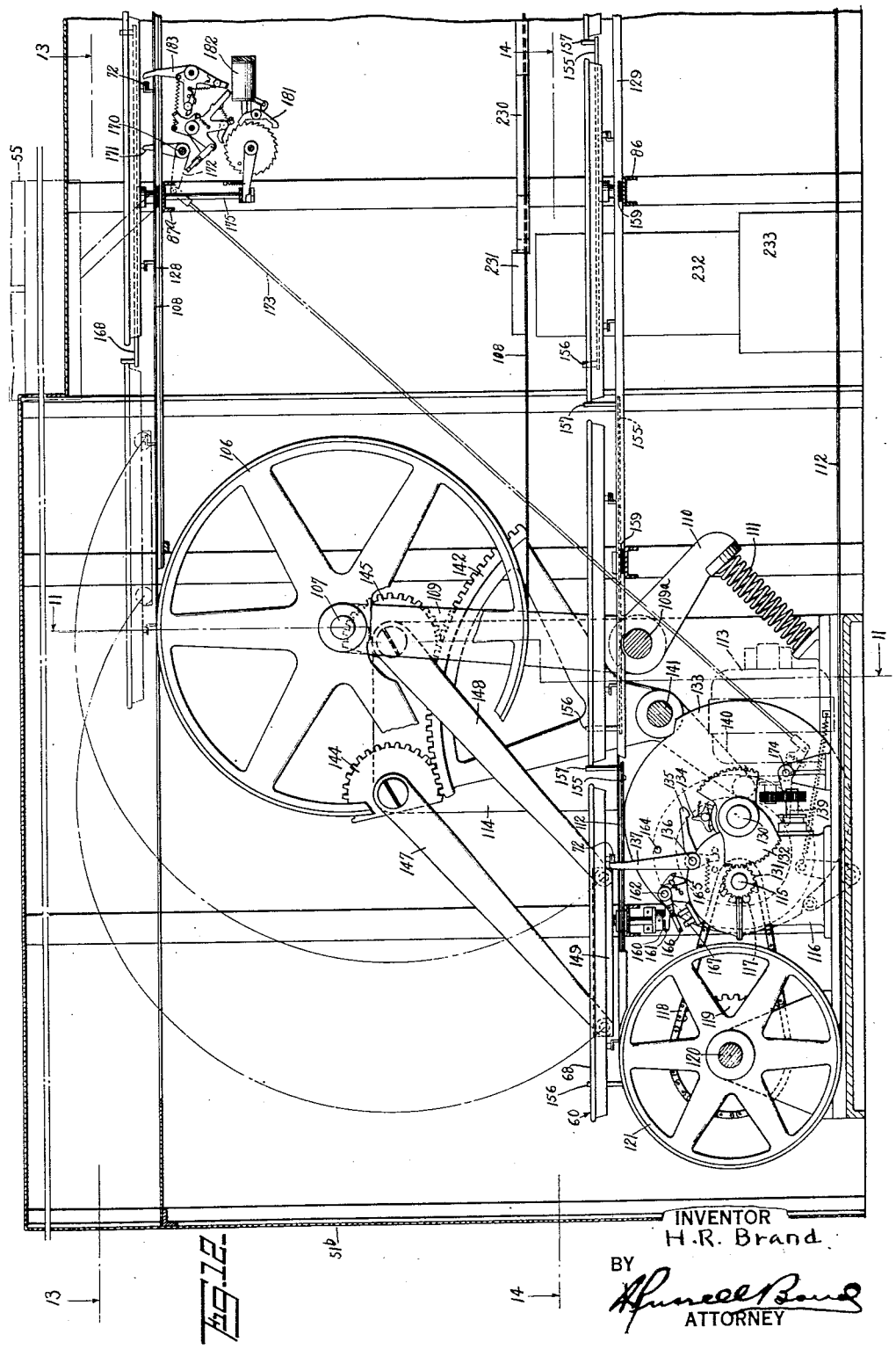

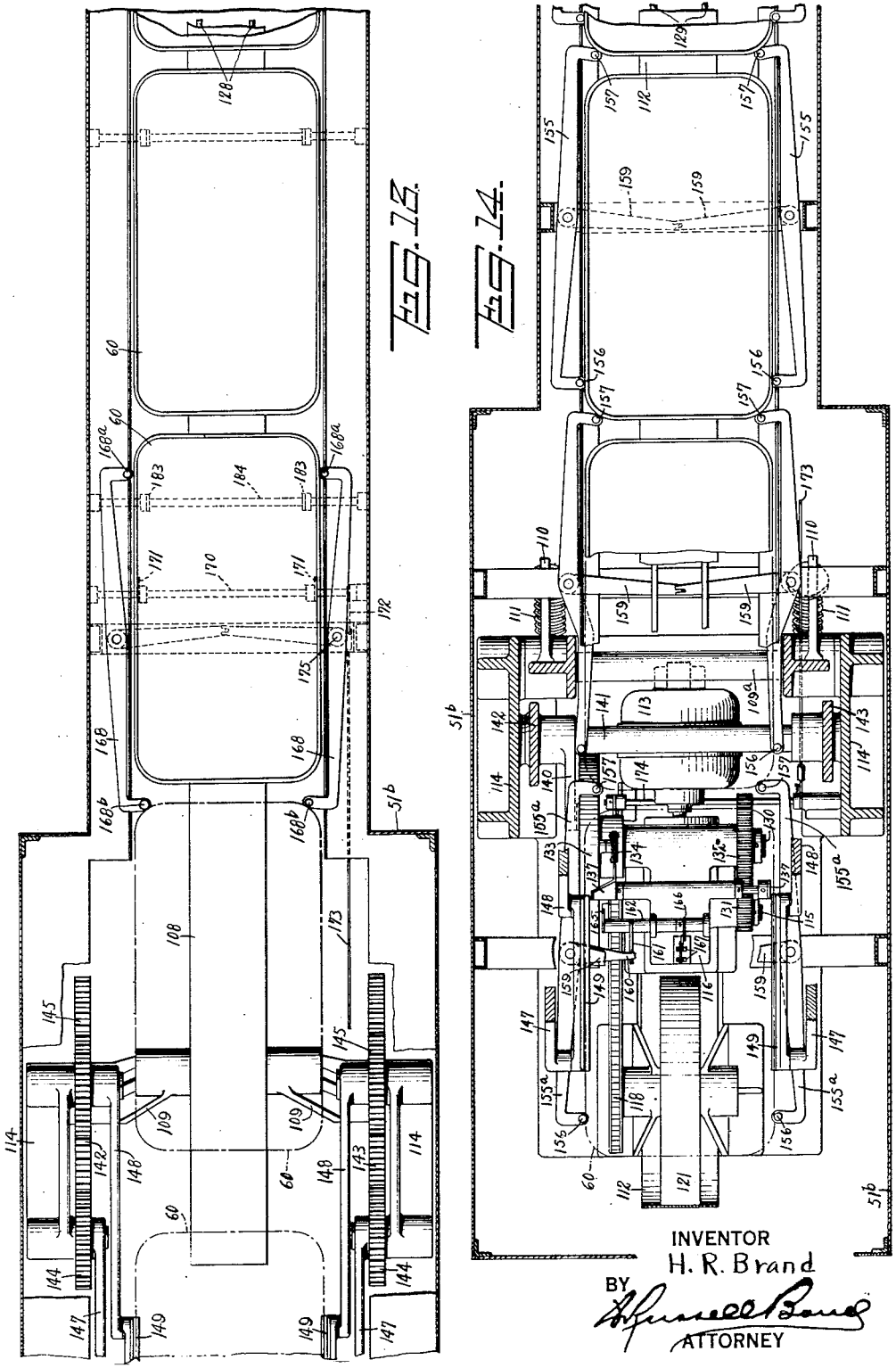

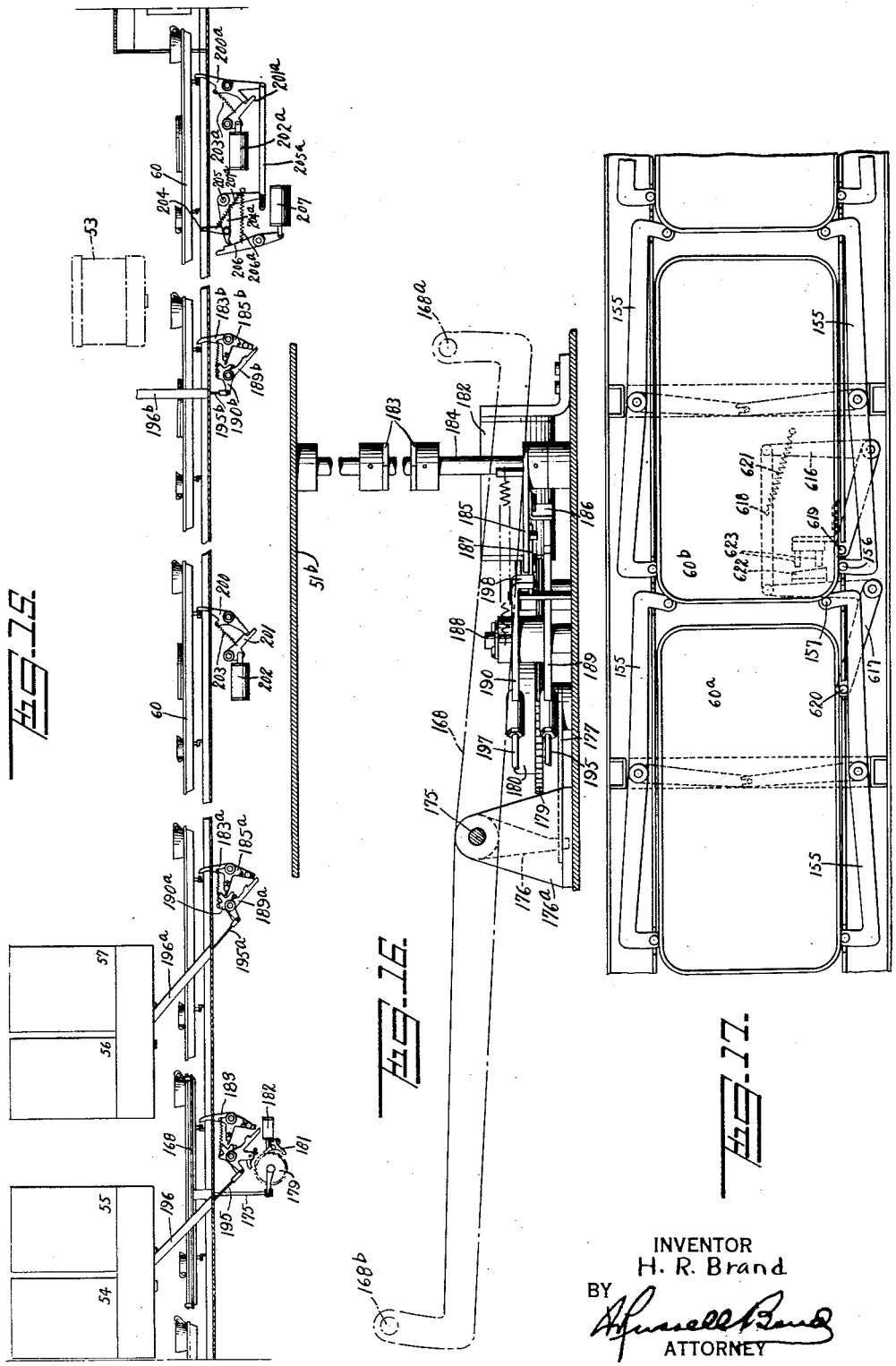

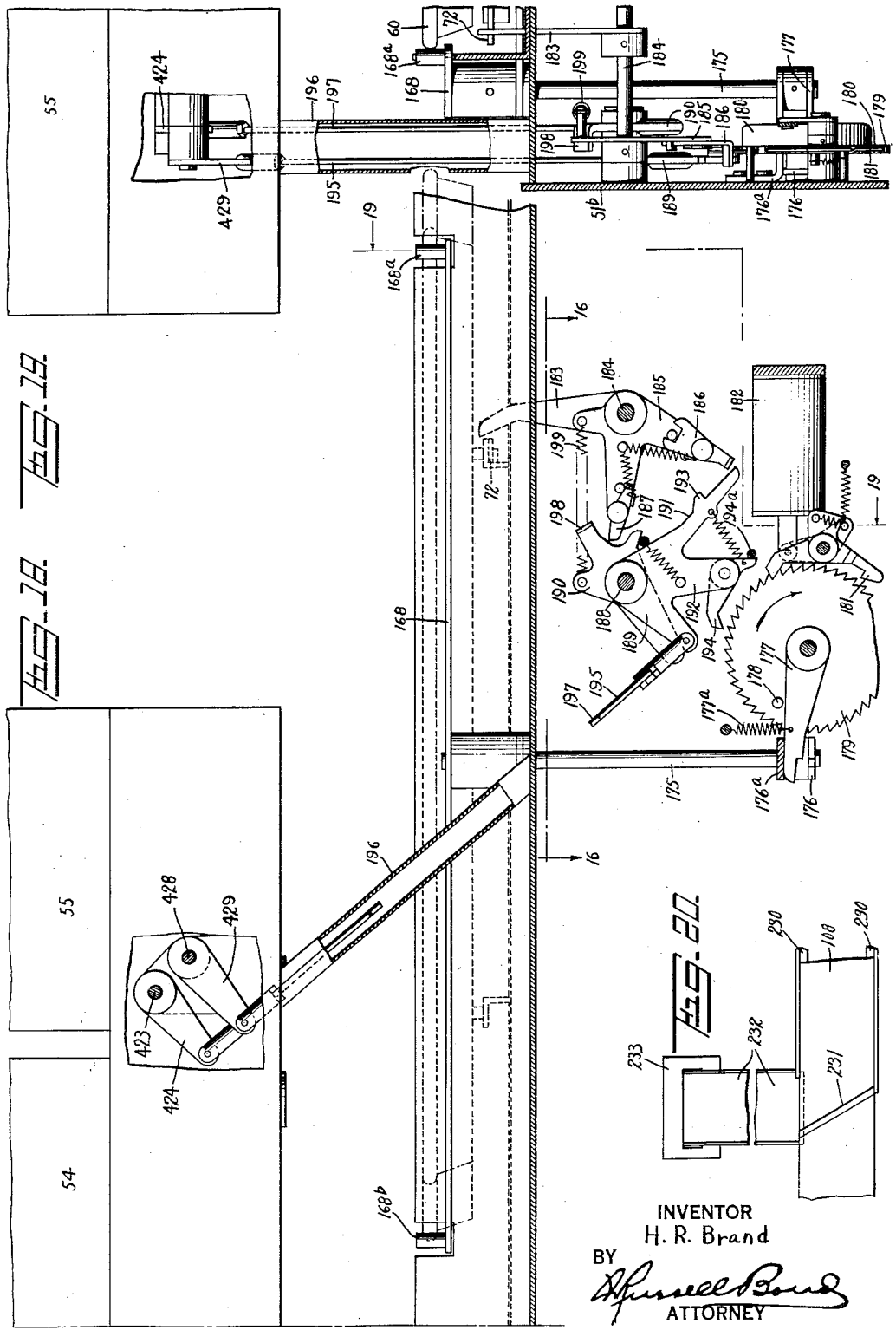

Dec. 12, 1933.  H. R. BRAND  1,938,577
AUTOMATIC SALES SYSTEM
Filed June 27, 1928  21 Sheets-Sheet 11
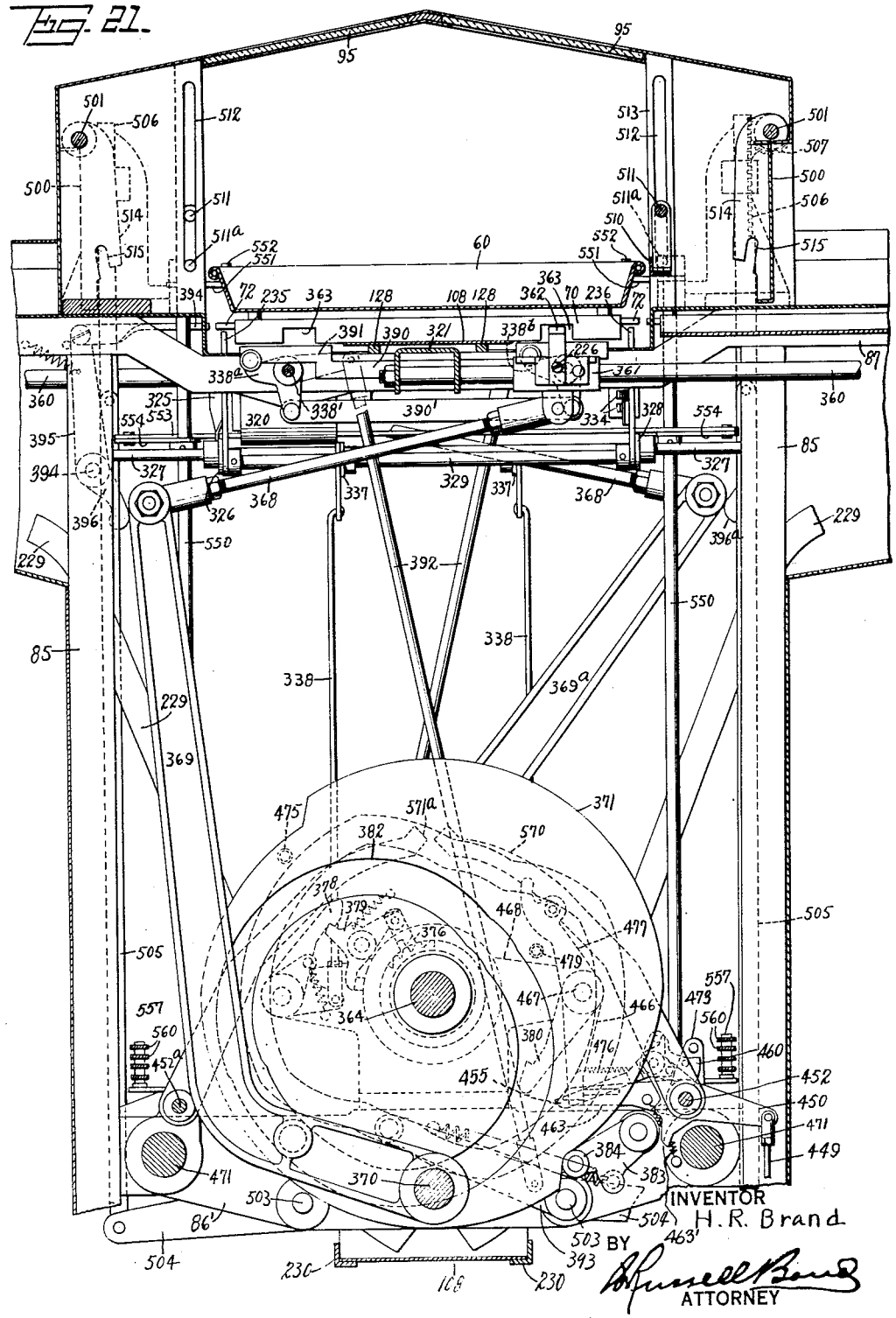

Dec. 12, 1933.    H. R. BRAND    1,938,577
AUTOMATIC SALES SYSTEM
Filed June 27, 1928    21 Sheets-Sheet 12
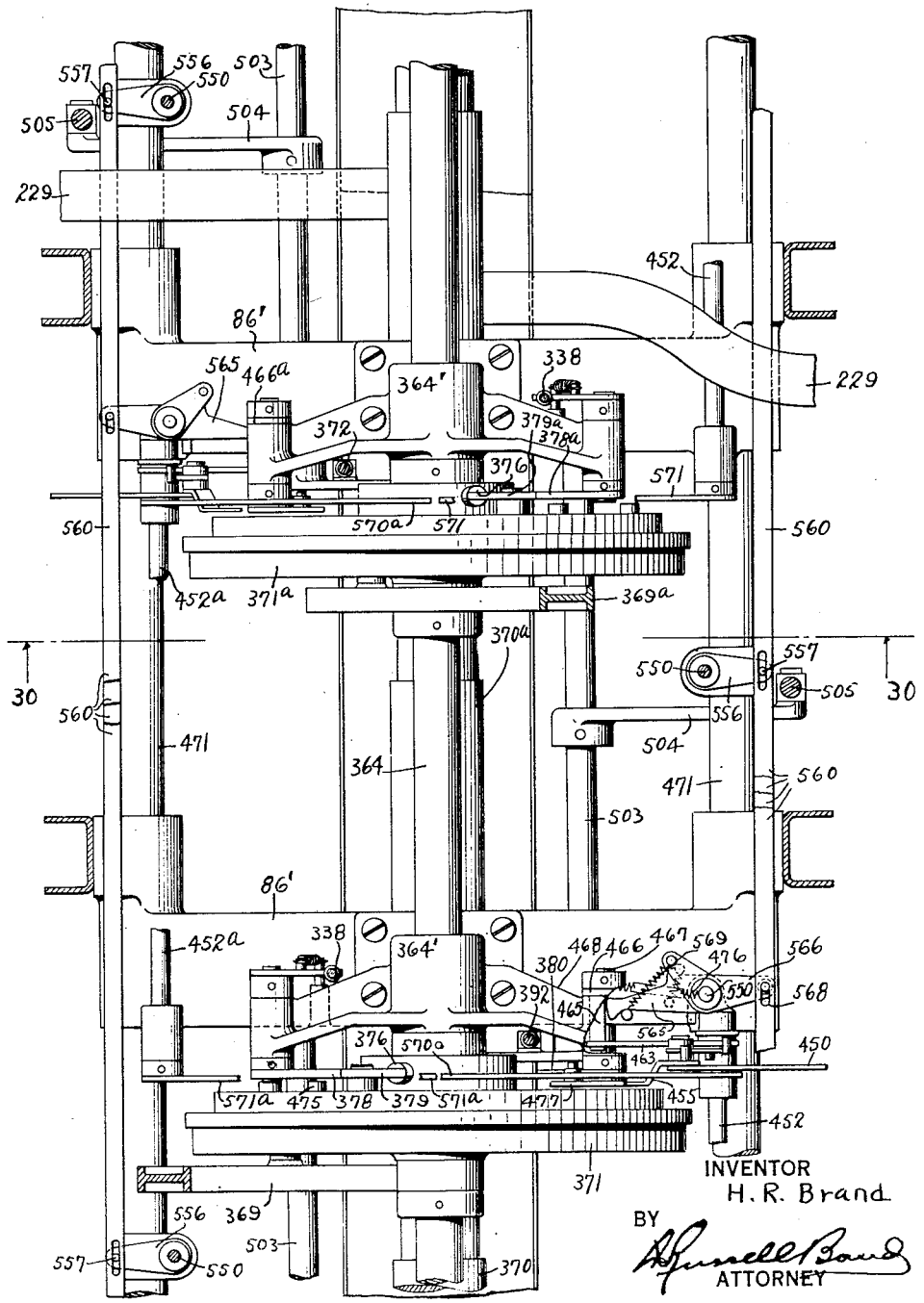

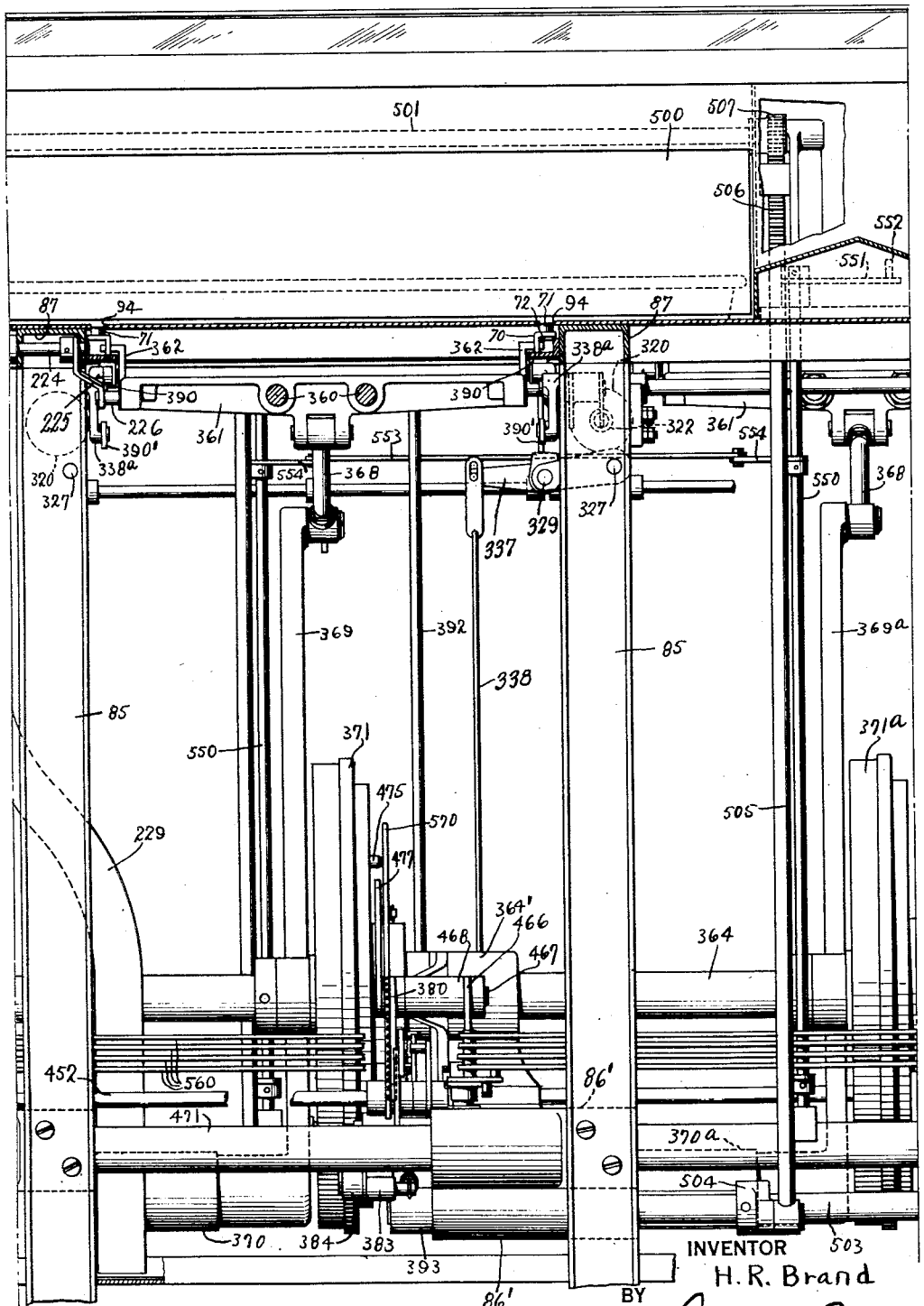

Dec. 12, 1933.  H. R. BRAND  1,938,577
AUTOMATIC SALES SYSTEM
Filed June 27, 1928  21 Sheets-Sheet 14
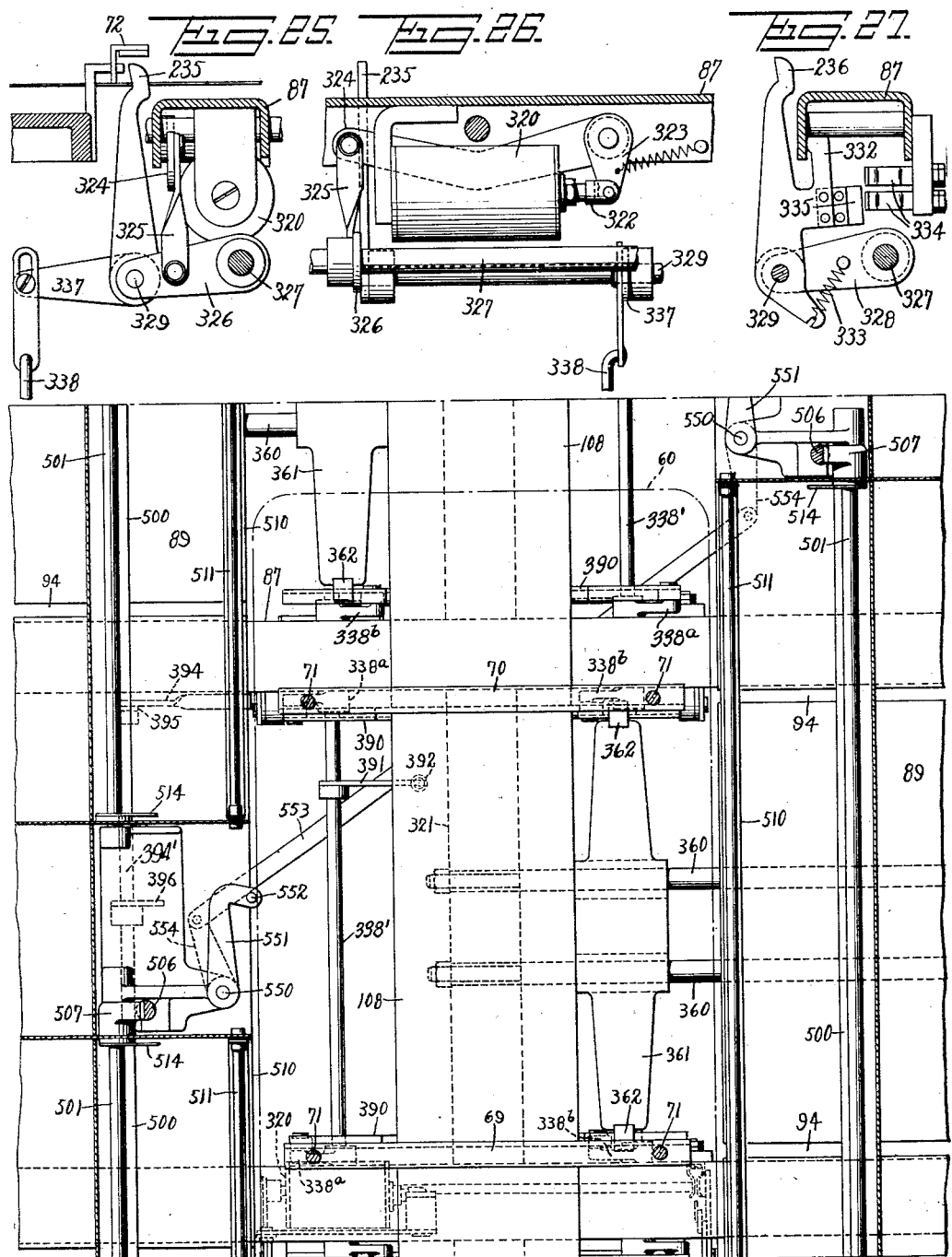
INVENTOR
H. R. Brand.
BY
ATTORNEY Dec. 12, 1933.  H. R. BRAND  1,938,577
AUTOMATIC SALES SYSTEM
Filed June 27, 1928   21 Sheets-Sheet 15
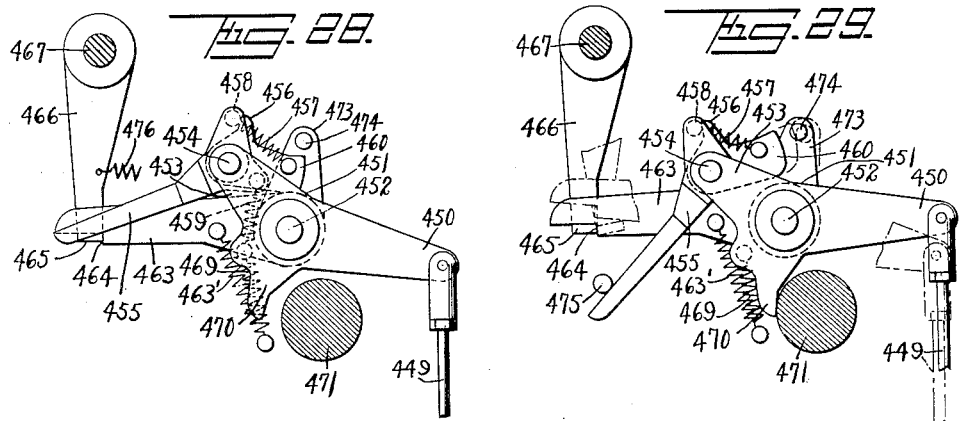
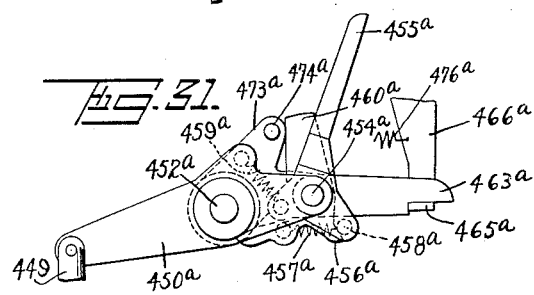
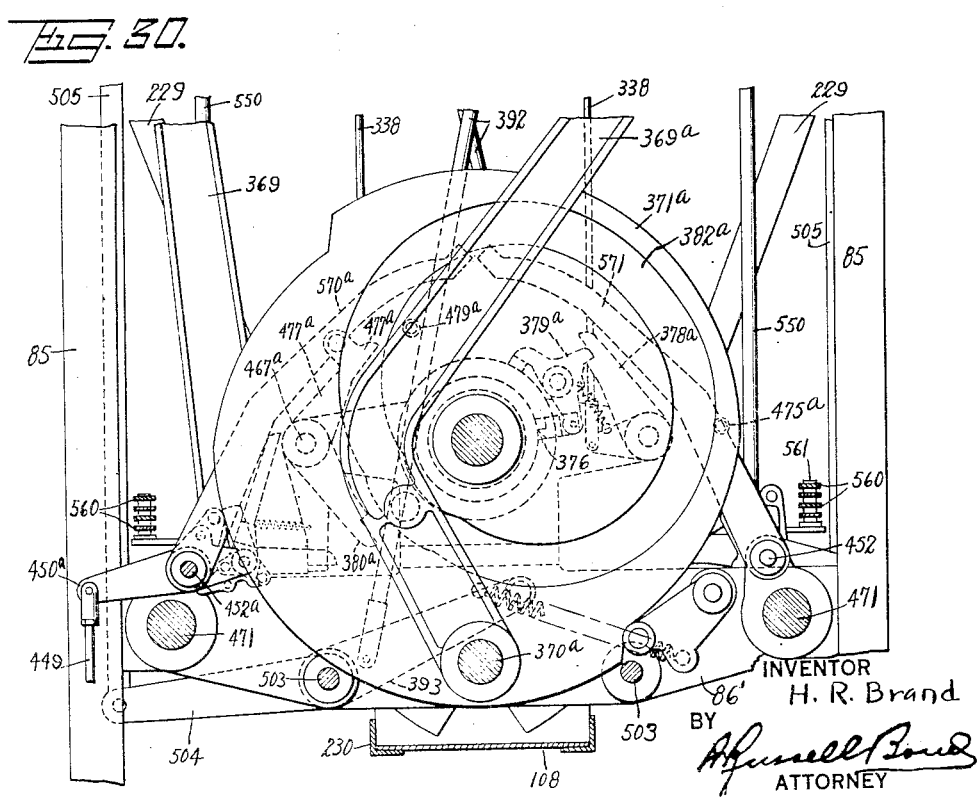
INVENTOR
H. R. Brand
BY
ATTORNEY

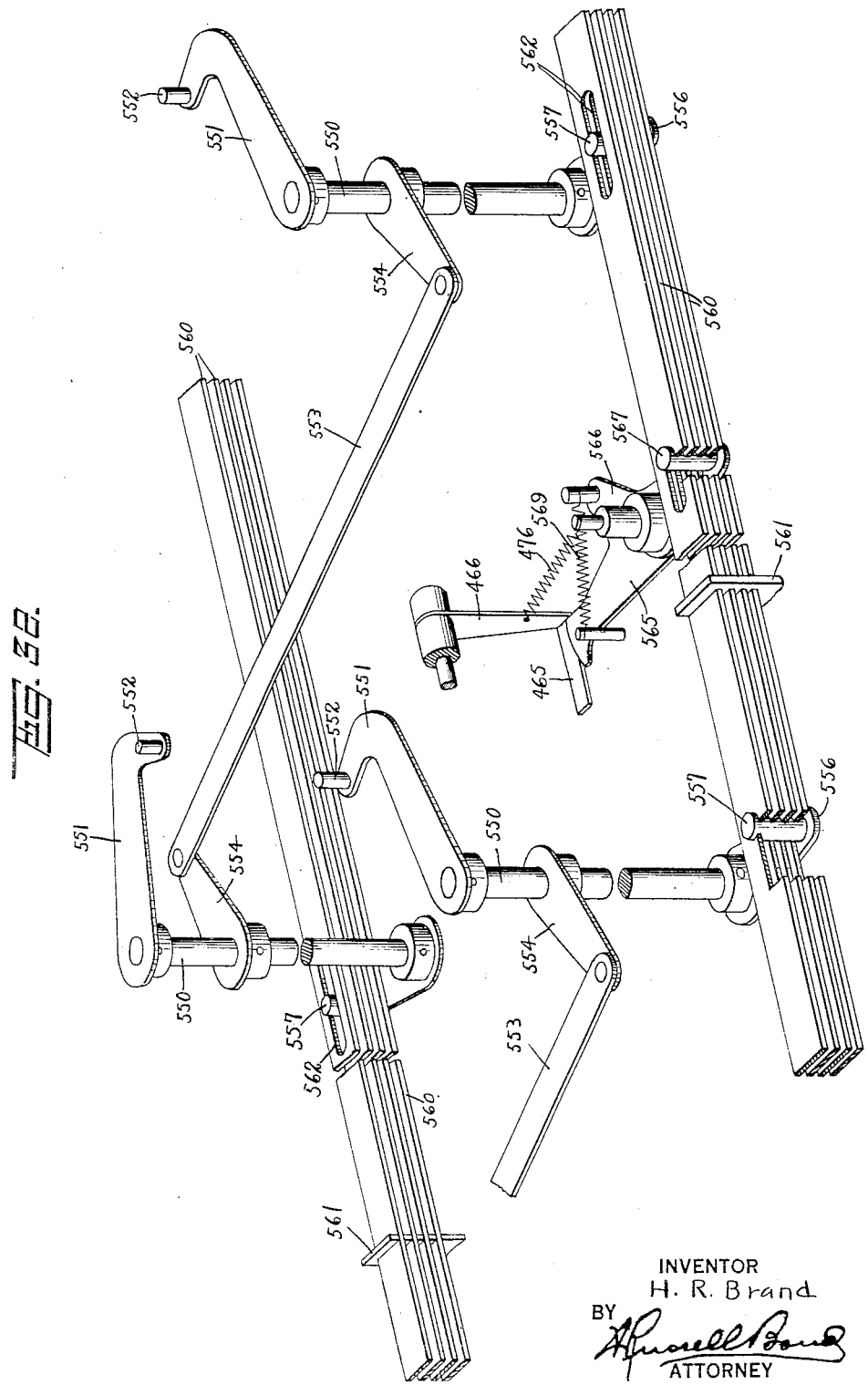

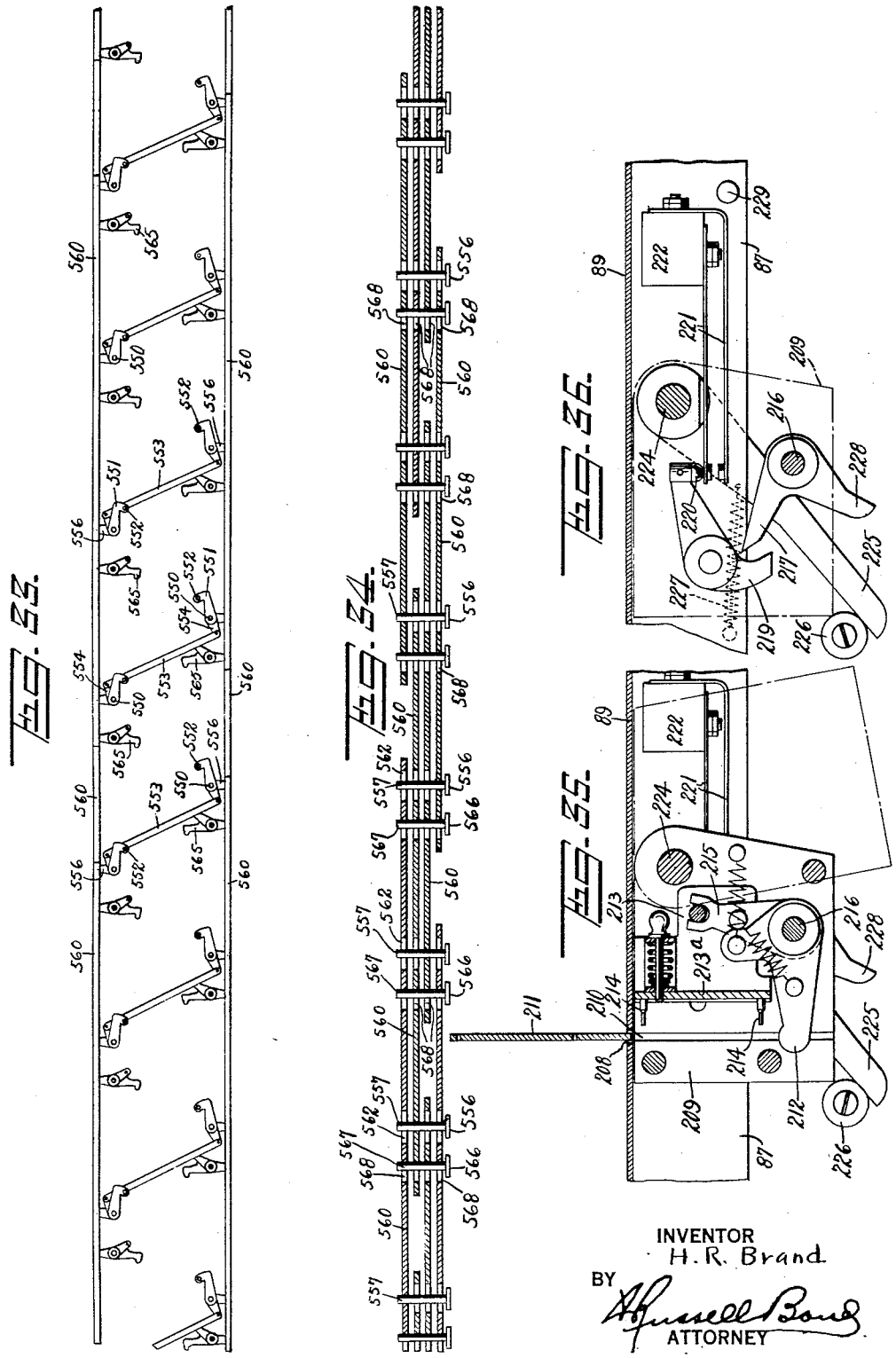

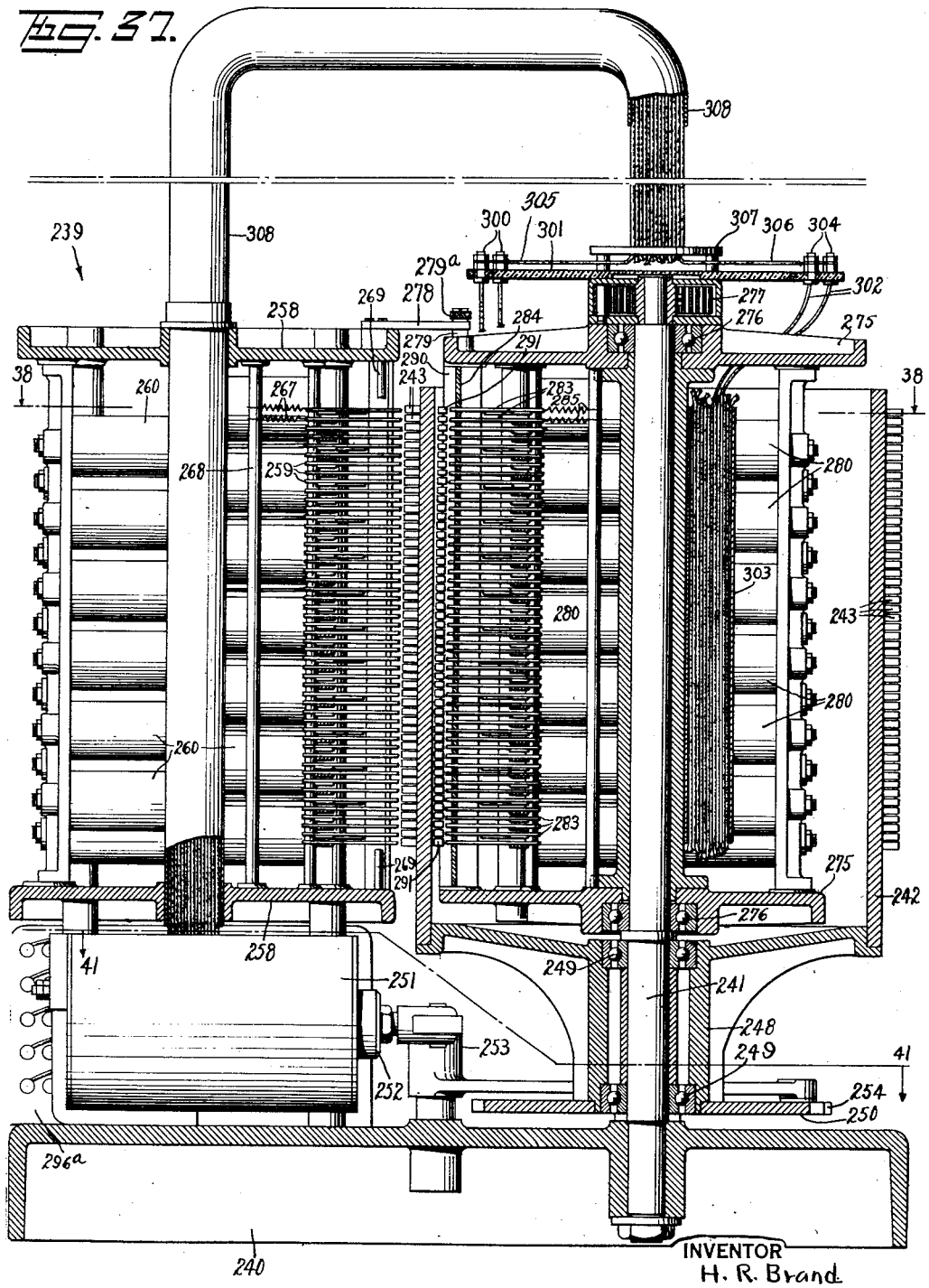

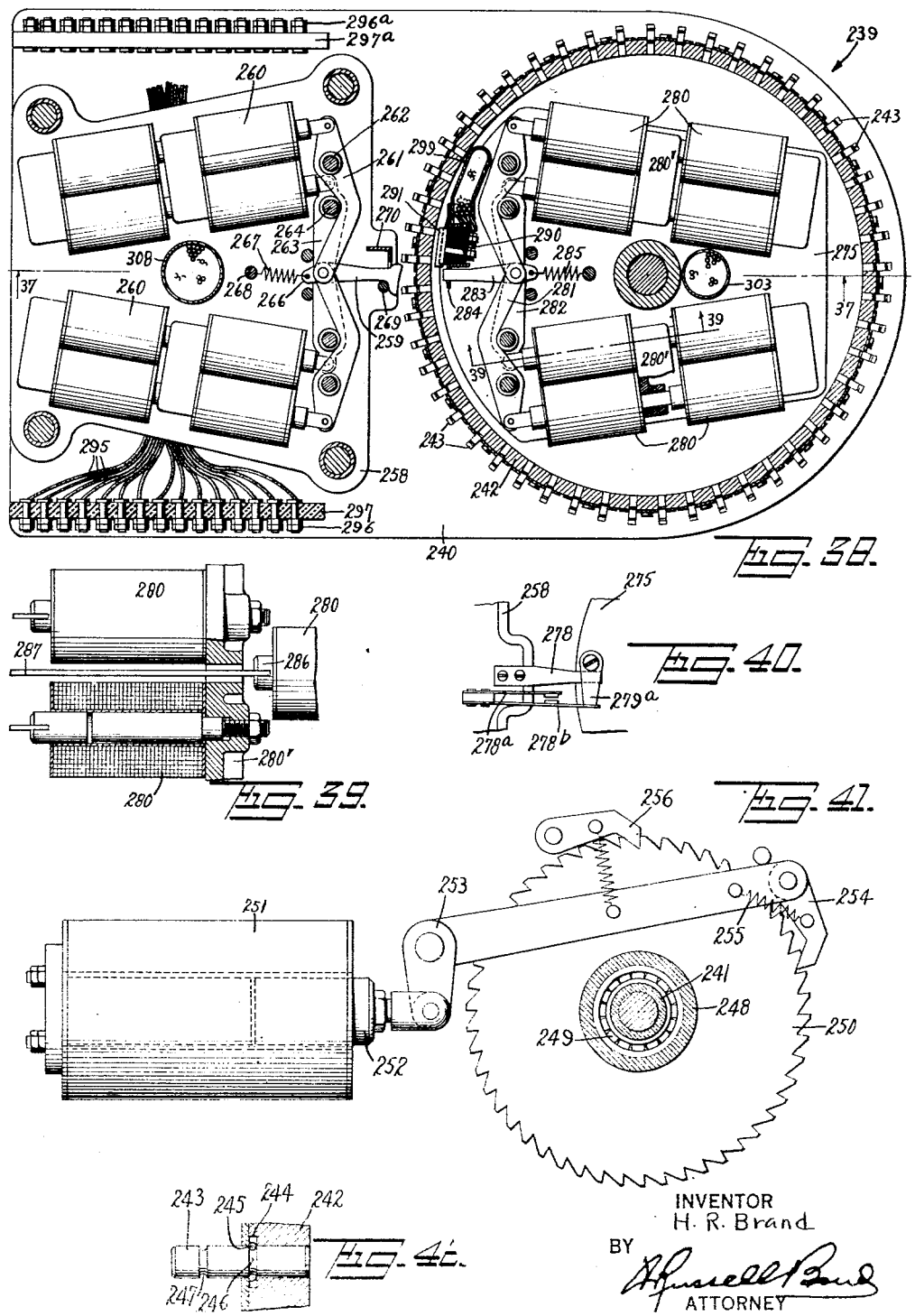

Dec. 12, 1933.　　　H. R. BRAND　　　1,938,577
AUTOMATIC SALES SYSTEM
Filed June 27, 1928　　21 Sheets-Sheet 20
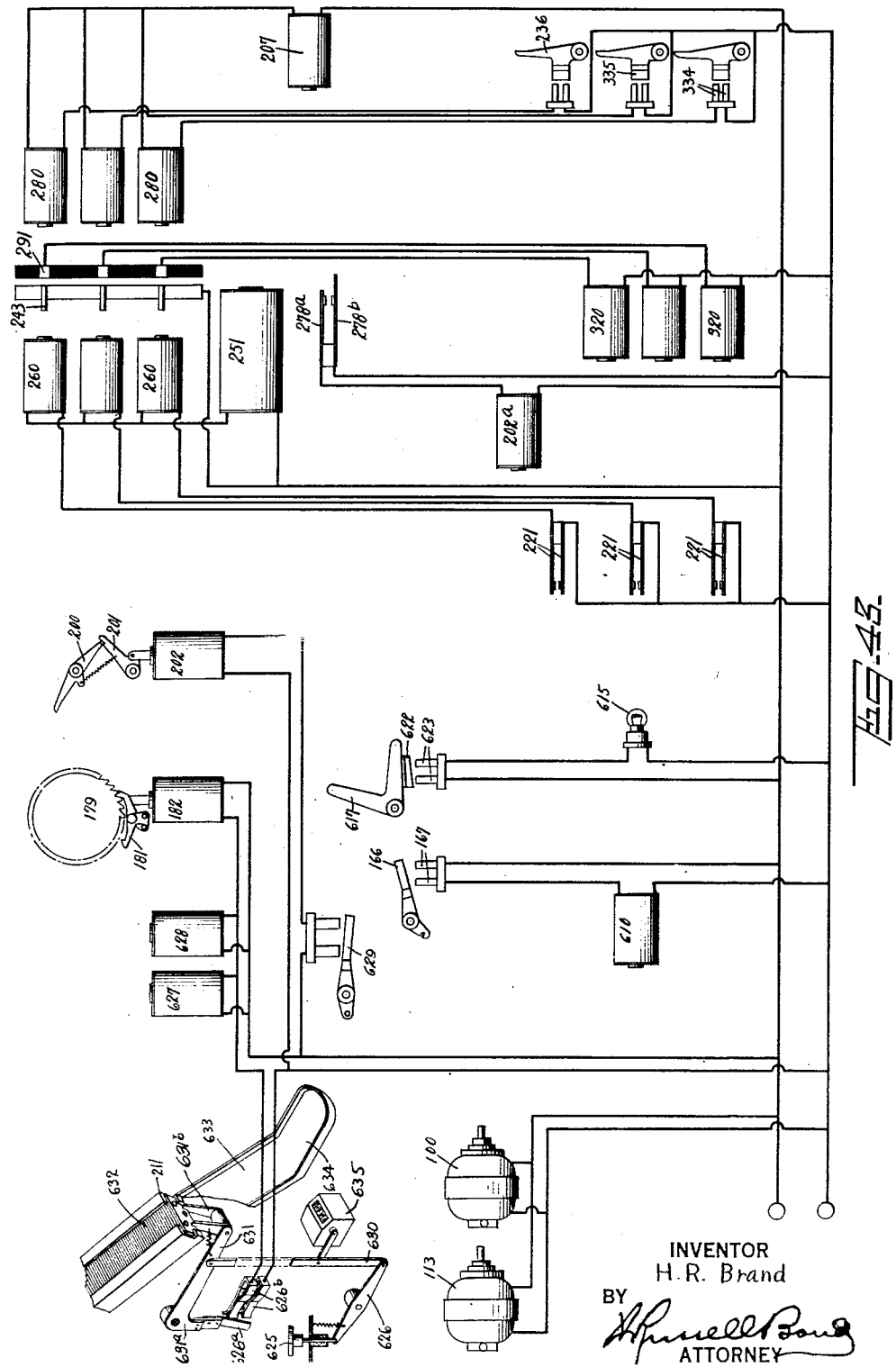
INVENTOR
H. R. Brand
BY
ATTORNEY Dec. 12, 1933.  H. R. BRAND  1,938,577
AUTOMATIC SALES SYSTEM
Filed June 27, 1928   21 Sheets-Sheet 21

INVENTOR
H. R. Brand
BY
H Russell Band
ATTORNEY

Patented Dec. 12, 1933

1,938,577

UNITED STATES PATENT OFFICE 1,938,577

AUTOMATIC SALES SYSTEM

Harry Russell Brand, New York, N. Y.

Application June 27, 1928. Serial No. 288,722

51 Claims. (Cl. 194—10)

My invention relates to automatic systems for handling commodities and has for an object to provide a new method of merchandising and apparatus for carrying out such method.

An object of this invention is to provide a sales system in accordance with which an article may be automatically dispensed, with complete involuntary control over the entire transaction and by a single individual whereby full responsibility may be placed upon said individual for the entire transaction.

A further object is to provide a system of the character described in accordance with which the entire dispensing act may be performed without the intervention of the human element.

A further object is to provide a sales system which will automatically assemble and vend a plurality of different articles as part of the same sales transaction and deliver them as a unit with complete involuntary control over the entire transaction.

A further object is to provide a sales system which will dispense articles some or all of which may be prepared, portioned or assembled on order, and to dispense all of said articles automatically as a unitary sales transaction without the intervention of the human element, and with a unitary complete involuntary control.

A further object is to provide a sales system in accordance with which an article may be automatically dispensed and delivered to any one of a plurality of receiving stations without interference from other articles, and without the intervention of the human element.

A further object is to provide a sales system in accordance with which implements adapted to contain or be used with an article to be dispensed may be assembled and delivered with the article, to the serving station, remaining there as long as required, and may then be restored to service, all without the intervention of the human element.

A further object is to provide a system of vending a plurality of articles prepared to order as a part of a unitary sales transaction in accordance with which the preparation or portioning of each of said articles is automatically commenced at such relative times that all are ready for delivery in predetermined time relation and for assembling and delivering said articles, all as a part of the same sales transaction.

A further object is to provide a dispensing system which will reduce the human labor necessary for the dispensing act to a minimum and which will reduce the cost and increase the speed and sanitation of the service. This is particularly important where the commodities dispensed are articles of food.

A further object is to provide a dispensing system which will reduce the congestion to a minimum and insure a prompt and efficient service of a kind which when the articles dispensed are articles of food, will insure uniformity of quality and the delivery of the articles to the customers at a proper temperature for service and which will remove the remains of food and the implements and restore the latter to service promptly and without unnecessary noise, whereby when the invention is embodied in a restaurant, the dining room is kept quiet and in an attractive condition.

Another object of my invention is to provide means at a supply station for preparing a plurality of commodities in response to a single initiating impulse from an order station and to deliver said commodities as a group.

Another object is to provide a plurality of delivery or serving stations to which commodities are automatically conveyed from a supply station and to provide selective means for determining to which of said delivery stations the commodity shall be delivered.

Another object is to automatically remove from the delivery or serving station such residue or part of the order, if any, as may not be taken by the purchaser.

Another object is to provide a plurality of delivery or serving stations to which commodities are selectively delivered in response to mechanism controlled by depositing tokens at the serving stations, the commodities being delivered to the stations in the order in which the tokens are deposited.

My invention is particularly adapted for use in a restaurant to automatically prepare and dispense food, although it will be obvious that it is not limited to such application. As embodied in an automatic restaurant, provision is made for delivering the food on a tray or the like to one of a plurality of serving stations at a counter, table, or the like, under the selective control of token-actuated mechanism, and means are also provided for removing the tray and delivering it to a washing station, the customer, by the act of leaving the serving station, automatically releasing the mechanism which removes the tray.

Another object of the invention is to provide a single conveyor for conveying trays of food from a supply station to a serving station and for conveying the trays from the serving station to a washing station, means being also provided for preventing collisions of trays returned to the conveyor with trays already on the conveyor.

With these and other objects in view, some of which will be explicitly pointed out hereinafter, and others of which will be readily apparent, I shall now describe a preferred embodiment of my invention, and thereafter shall define the novelty and scope of the invention in the claims.

In the accompanying drawings, Fig. 1 is a top plan view of an automatic restaurant embodying my invention, a portion of the restaurant being shown in section and the section being taken on the line 1—1 of Fig. 2;

Fig. 2 is a view in longitudinal section on the line 2—2 of Fig. 1;

Fig. 3 is a view in cross section taken on the line 3—3 of Fig. 1;

Fig. 4 is a plan view of a tray on which food is conveyed from the kitchen to the serving space;

Fig. 5 is a view in section taken on the line 5—5 of Fig. 4;

Fig. 6 is a top plan view of one of the cleats supporting the tray;

Fig. 7 is a view in longitudinal section of that portion of the conveyor system which is located in the washroom, the section being taken on line 7—7 of Fig. 10;

Fig. 8 is a top plan view of the mechanism shown in Fig. 7, certain parts being broken away.

Fig. 9 is a longitudinal section taken on the line 9—9 of Fig. 7;

Fig. 10 is a view in transverse section taken on the line 10—10 of Fig. 7;

Fig. 11 is a view in transverse section of that portion of the conveyor system which is located in the kitchen, the section being taken on the line 11—11 of Fig. 12;

Fig. 12 is a view in longitudinal section of a portion of the conveyor system located in the kitchen showing particularly the mechanism for lifting trays from the lower conveyor belt to the upper conveyor belt, the section being taken on the line 12—12 of Fig. 11;

Fig. 13 is a view in section taken on the line 13—13 of Fig. 12;

Fig. 14 is a view in section taken on the line 14—14 of Fig. 12;

Fig. 15 is a fragmentary side elevation of mechanism for controlling the dispensing of food in the kitchen;

Fig. 16 is an enlarged sectional view, the section being taken substantially along the line 16—16 of Fig. 18;

Fig. 17 is a plan view of certain control mechanism connected with the lower conveyor;

Fig. 18 shows an enlargement of part of the dispensing mechanism shown in Fig. 15;

Fig. 19 is a view in section taken along the line 19—19 of Fig. 18;

Fig. 20 is a plan view of a device for removing tokens from the lower run of the upper conveyor belt and delivering them into a token receptacle;

Fig. 21 is a view on an enlarged scale of a portion of Fig. 3 showing the mechanism for delivering trays to and withdrawing trays from the right hand counter;

Fig. 22 is a view in longitudinal section taken on the line 22—22 of Fig. 3;

Fig. 23 is a view in section taken on the line 23—23 of Fig. 3;

Fig. 24 is a view in section taken on the line 24—24 of Fig. 3;

Fig. 25 is a side elevation of a trip mechanism for arresting a tray on the upper conveyor;

Fig. 26 is a fragmentary view of said trip mechanism as viewed from the right of Fig. 25;

Fig. 27 is a view of a companion trip finger on the opposite side of the conveyor from the trip finger shown in Fig. 25;

Figs. 28 and 29 illustrate different positions of certain latch mechanism for controlling the withdrawal of a tray from the right hand counter;

Fig. 30 is a view in section on the line 30—30 of Fig. 22 showing the cam controlled mechanism for delivering trays to and withdrawing trays from the left hand counter;

Fig. 31 is a detail view of certain latch mechanism for controlling the withdrawal of a tray from the left hand counter;

Fig. 32 is a view in perspective of interlocking mechanism for preventing trays from being delivered from the counters to the conveyor while a tray is being carried by the conveyor;

Fig. 33 is a plan view of the mechanism shown in Fig. 32;

Fig. 34 is a view in longitudinal section of certain locking plates shown in Fig. 32;

Fig. 35 is a view in section of a token receiver;

Fig. 36 is a view of certain mechanism controlled by the token receiver;

Fig. 37 is a view in vertical section of a tray routing controller, the section being taken on the line 37—37 of Fig. 38;

Fig. 38 is a view in section taken on the line 38—38 of Fig. 37;

Fig. 39 is a fragmental view in section taken on the line 39—39 of Fig. 38;

Fig. 40 is a detail view of a contact device employed on the tray routing controller;

Fig. 41 is a view in section taken substantially on the line 41—41 of Fig. 37;

Fig. 42 is an enlarged detail view of a pin mounted in a pin drum of the tray routing controller;

Fig. 43 is a diagram of electrical connections;

Figure 44:
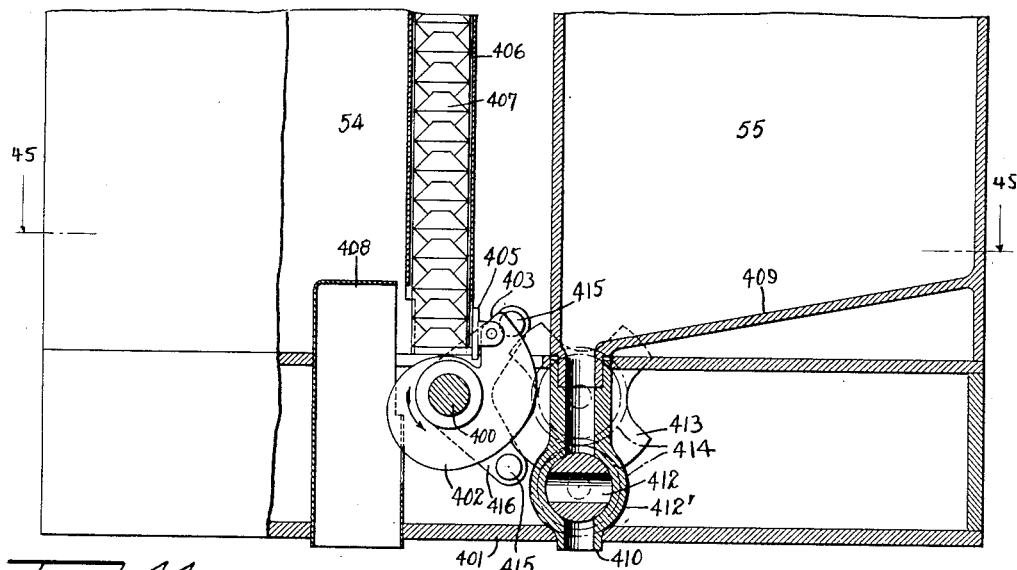
Fig. 44 is a fragmentary view in vertical section of the dispensing valves in certain food containers, the section being taken on line 44—44 of Fig. 45.
Figure 46:
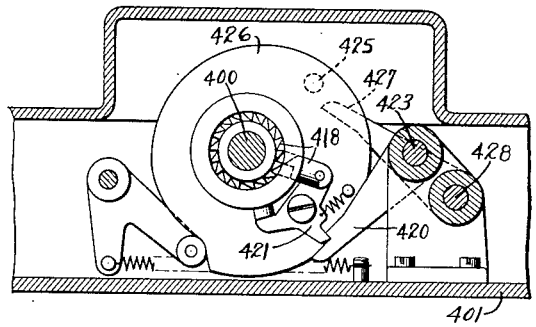
Fig. 46 is a view in section taken on line 46—46 of Fig. 45.

The invention is herein illustrated as embodied in an automatic restaurant since certain of the features are more particularly applicable to that use, and as herein embodied it comprises an order station and one or more service units associated therewith. At the order station, the customer places his order for a meal, pays for it in advance and receives a token which entitles him to the meal. As each token is uttered, an impulse is delivered to the service unit which initiates the preparation of the meal ordered.

The service unit comprises a kitchen, a wash room, and a conveyor gallery extending between the kitchen and the wash room. The conveyor gallery houses an upper and a lower conveyor belt and supports at each side thereof, a serving counter upon which trays of food are delivered from the upper conveyor by token controlled mechanism. Stools are provided for seating the customers at the counters and when a customer has finished a meal, the act of leaving his stool automatically actuates mechanism for returning the tray to the upper conveyor and the latter then carries the tray out to the wash room. The lower conveyor carries the trays, after being washed, back to the kitchen.

In the accompanying drawings, I show, by way of illustration, a single serving unit adapted to serve griddle cakes and coffee, although it will be obvious that other food combinations might be served.

Referring to Fig. 1, the order unit is housed in a cashier's cage 50, while at one side of the cashier's cage is the kitchen 51 of a serving unit, the kitchen being enclosed in a housing 51a. For advertising purposes, the walls of the kitchen may be of glass or may have glass panels therein through which the operation of the automatic mechanism in the kitchen may be watched by the public.

As indicated in Figs. 1 and 2, the kitchen contains an automatic machine 52 for baking and dispensing griddle cakes, an automatic coffee making and dispensing machine 53, and containers 54, 55, 56 and 57 from which sugar, syrup, butter and cream respectively are automatically dispensed. The wheat cake machine 52 is preferably of the type disclosed in my co-pending application Serial No. 268,659, filed April 9, 1928, and since issued as Patent No. 1,848,104, and the coffee machine 53 may be of the type described in my co-pending application Serial No. 277,087, filed May 11, 1928, and since issued as Patent No. 1,822,433.

The food is delivered to the customer on a tray 60 which is of the form shown in Figs. 4 and 5. The body of the tray may be of sheet metal or other suitable material with depressions formed therein to receive a plate 61 for the cakes, a coffee cup 62, a syrup pitcher 63, and a cream pitcher 64. A depression 65 provides a place for a pat of butter and a depression 66 for lumps of sugar, while a depression 67 between the plate and the cup is adapted to receive the necessary table utensils such as a knife, fork and spoon. The tray is rounded at the corners to facilitate the passage of the tray between certain gate levers, as will be explained hereinafter, and is provided with flaring sides terminating in an outwardly overhanging bead 68. The body of the tray is supported on front and rear transverse cleats 70 and 69 respectively being secured thereto but spaced therefrom by pins 71. The cleats 69 and 70 are preferably formed of angle rails, with the horizontal flange of each angle adjacent the tray body and the vertical flange depending therefrom. The front cleat 70, that is, the cleat nearer the leading edge of the tray as it is conveyed out of the kitchen, carries a pair of fingers 72 which are slidable along the underface of the horizontal flange of the cleat. These fingers have pin and slot engagement with the cleat and may either be extended beyond the opposite ends of the cleat as shown in Fig. 6 or may be retracted within the cleat. Owing to the flaring of the side walls of the tray and the overhang of the side rims, the fingers 72, when in extended position, do not project beyond the beads 68. Each finger is formed at its inner end with a pair of notches 73—73 adapted to be engaged by a leaf spring 74 which holds the fingers either in extended position or in retracted position. The purpose of these fingers will be explained hereinafter.

*The conveyor gallery*

The conveyor belt for delivering trays of food to the customers runs from the kitchen through a conveyor gallery 80, see Figs. 1 and 2, to the wash room 81. The latter is preferably separated from the rest of the restaurant by a wall 82, through which there are openings 83 large enough to pass the conveyors and their loads.

The conveyor gallery consists of a long casing 80 of the general cross section shown in Fig. 3 and comprises a framework of uprights 85 connected at suitable points by cross beams 86 and 87. A sheathing 88 is supported by the uprights 85.

The cross beams 87 extend outward to support plates of metal or other suitable material 89 which serve as counters. Each counter is divided by means of moldings or low partitions 91 into separate seatings or serving stations 92 (Fig. 1), each seating being just large enough to receive a tray. In front of each seating is a stool 93 which will be described in further detail hereinafter. It will be observed from an inspection of Fig. 1 that the seatings of one counter are preferably staggered with respect to those of the opposite counter so as to accommodate the mechanism which moves the trays from the conveyor to the counters and back again. The conveyor gallery projects above the counters and is provided with doors through which the trays are delivered to and withdrawn from the counter, as will be described hereinafter. The top of the conveyor gallery is preferably fitted with glass panels 95, through which the progress of the tray along the gallery may be observed. As shown, the tops of the partitions 91 and the conveyor gallery 95 are sloped and, hence, should a customer place the utensils on the partitions or gallery instead of upon the tray, such utensils will slide by gravity back upon the tray.

An extension 99 of the conveyor gallery extends into the wash room, and housed within this casing 99 (see Figs. 7, 8 and 10) is an electric motor 100 or other suitable power unit. The motor is suitably geared to a driving pinion 101 which is connected by a chain belt 102 to a sprocket wheel 103 keyed upon a shaft 104. Secured upon the shaft 104 is a pulley 105. In the kitchen, within a casing 51b which forms an extension of the conveyor gallery, there is a companion pulley 106, (Figs. 2, 11 and 12) mounted upon a shaft 107. An endless belt 108 preferably of steel, is passed about the pulleys 105 and 106. The shaft 107 is journaled in a pair of upright arms 109 mounted on a shaft 109a. A pair of angularly disposed arms 110 (see also Fig. 14) integrally connected to the arms 109, are engaged by springs 111 which serve to take up slack in the belt and maintain the desired tension therein. The belt 108 constitutes the upper conveyor belt above referred to which conveys the loaded trays from the kitchen.

The lower belt 112, which conveys the empty trays from the wash room to the kitchen, is driven by a separate motor 113 (Figs. 12 and 14) located in the kitchen within the housing 51b. The motor 113 drives a shaft 115 through a set of reduction gears, certain of which are enclosed within a housing 116. A sprocket wheel 117 secured upon the shaft 115 is connected by a chain belt 118 to a sprocket wheel 119 mounted on and fixed to a shaft 120. The shaft 120 has secured thereon a driving pulley 121, and in the wash room (Fig. 7) within the casing 99, there is a companion idler pulley 122. About these two pulleys the lower conveyor belt 112 is passed. The pulley 122 is mounted on a shaft 123 which is journaled between the arms of a pivoted yoke member 124. A pair of springs 126 serve to press the arms of the yoke 124 outward and thereby take up slack in the belt 112.

Owing to the length of the conveyor belts and to the weights that are to be imposed upon them, it is necessary to provide them with rigid supports throughout their length to prevent them from sagging. To this end, rails 128 (Figs. 3 and 12) are supported by the cross beams 87 and beams 87a directly under the upper run of the belt 108 and, similarly, rails 129 are mounted on the cross beams 86 to support the upper run of the lower belt 112.

Tray lifting mechanism

Within the housing 51b, mechanism is provided for lifting the trays from the lower belt to the upper belt. Running transversely to and between the upper and lower runs of the belt 112, Figs. 11, 12 and 14, is a cam shaft 130 which is driven from the shaft 115 by means of a pinion 131 engaging a gear 132 mounted on the cam shaft. Also secured upon shaft 130 is a cam 133 which is preferably located to one side of the belt 112. A clutch is provided for operatively connecting the cam 133 to the cam shaft 130. This clutch is controlled by a clutch lever 134 which is normally held in inactive position either by a dog 135 or a dog 139 (Fig. 12), these dogs being spaced 180 degrees apart. The dog 135 is fixed upon a shaft 136, and the latter has a pair of arms 137 which lie in the path of the projecting fingers 72 of a tray. When the arms 137 are struck by the tray fingers, they oscillate the shaft 136, lifting the dog 135 out of engagement with the clutch lever 134 and permitting the clutch to connect the cam to the cam shaft. The cam then makes a half revolution, when it is released from engagement with the cam shaft by engagement of the dog 139 with the clutch lever 134. The operation of this clutch is similar to that of the clutches 376 shown in Figs. 21 and 30 hereinafter described.

The cam 133 is formed with a suitable cam groove engaged by a roller upon an arm 140 keyed to a transverse shaft 141. The shaft is journaled in brackets 114 at opposite sides of the housing 51b. Integral with the arm 140, is a toothed sector 142. Keyed to the shaft 141, near the opposite end thereof, is a companion toothed sector 143. Each sector is engaged by a pair of pinions 144 and 145 arranged in tandem thereon. The pinions are journaled in the brackets 114 and have secured thereto at each side of the conveyor, lifter arms 147 and 148 respectively, which, at their free ends, are pivotally connected to lifter rails 149. These rails are located at opposite sides of the conveyor in such position as to fit under and engage the beads 68 on opposite sides of a tray 60. The arms 147 are outwardly offset with respect to the arms 148 so that they swing in different planes and hence clear each other.

In operation, when the cam 133 makes a half turn from the position shown in Fig. 12, the sectors 142 and 143 will be swung counterclockwise, swinging the arms 147 and 148 clockwise and thereby lifting the tray supported by the rails 149 from the lower belt as shown in full lines, to the upper belt as shown by broken lines. The arms 147 and 148 will then be held in this position until the tray has been carried off the rails 149 by the upper belt, when certain mechanism described hereinafter will be brought into play to release the engagement of the dog 139 with the clutch lever and permit the cam 133 to make another half turn; thereupon the sectors 142 and 143 will be swung in the opposite direction and the arms will be lowered to receive the next tray.

Tray-spacing gates

Spacing means are provided to prevent the trays from piling up on one another and jamming the conveyor, and also for holding back the trays on the lower conveyor until the lifting rails 149 are in receiving position. This spacing means consists of a series of gates through which the trays have to pass. Each gate consists of a pair of opposed levers 155 (Figs. 12 and 14) centrally fulcrumed and provided with vertical pins at each end which are alternately moved into and out of the path of trays. The pins at the forward ends of the levers are indicated in the drawings by the reference numeral 156 and those at the rear by the numeral 157. The terms "front" and "rear", as here used, apply to the direction of travel of the trays on the lower conveyor, the front end being at the left hand and the rear at the right, as viewed in Fig. 14. The pins are so spaced that when a tray is carried forward by the conveyor, it will first spread the pins 157 of opposite levers apart, thereby swinging the levers 155 in one direction, after which it will spread apart the forward pair of pins 156, swinging the levers back again. When the forward pins are spread apart, the rear pins 157 close behind the tray and present stops to prevent the advance of a succeeding tray until the tray ahead has cleared the forward pins 156. Each lever 155 is provided with an inwardly extending arm 159 and the adjacent ends of opposed arms 159 have pin and slot connection one with the other, so that the levers are virtually coupled or geared together, and movement of one member of a pair will result in corresponding but opposite movement of the other member of the pair.

The foremost pair of gate levers 155a is adapted to be locked in such position as to prevent a succeeding tray from moving forward into the lifting mechanism until the rails 149 have been returned to receiving position. To this end, one of the gate levers 155a is provided with a finger 160 (Fig. 14) which projects inward and is engaged by a notched arm 161 (see also Fig. 12) projecting from a shaft 162 journaled on the reduction gear casing 116. A spring presses the arm 161 against the finger 160, so that when the gate levers 155a have been swung into the position shown in Fig. 12 by a tray, they will be locked in such position by engagement of finger 160 with the notch in the arm 161. Thus, even after the lifter arms have removed the tray from between the gate levers 155a, the rear pins 157 of said levers 155a will prevent a succeeding tray from moving into the lifting mechanism until the finger 160 has been disengaged from the arm 161. The disengagement is effected by a pin 164 projecting from the cam 133 in position to engage an arm 165 carried by the shaft 162. When the pin 164 strikes the arm 165, the arm 161 is withdrawn from the finger 160 and thereupon the next succeeding tray, being urged forward by frictional engagement with the belt 112, and by reason of its rounded corners, will wedge apart the pins 157 of the arms 155a and advance into the lifting mechanism. The shaft 162 also carries a switch blade 166 which is swung into position to bridge a pair of spring contact terminals 167, and close an electric circuit through a counting mechanism in the wash room which will be described hereinafter.

In connection with the upper belt 108 (Figs. 12 and 13), there is a pair of gate levers 168, similar in every respect to the levers 155, which prevent a tray from moving off the lifting rails 149 until the next preceding tray has cleared the gate levers and made room for it.

Extending transversely under the tray, within the gate levers 168, is a shaft 170, suitably journaled in the walls of the casing 51b. This shaft has secured thereto a pair of fingers 171 which project into the path of the fingers 72 of the tray. An arm 172 secured to the shaft 170 is connected at its outer end by a pull-rod 173 to a crank on a shaft 174 (see also Figs. 11 and 14). On the shaft 174, the clutch dog 139 is secured, and the arrangement is such that when the fingers 171 are oscillated by engagement with fingers 72 of a passing tray, the dog 139 will be swung clear of the clutch lever 134. It will be understood that when the lifter arms have raised a tray to the upper belt, the cam 133 will have turned through 180 degrees from the position shown in Fig. 12, and the clutch 134 will be held in disengaged position by the dog 139. When the preceding tray passes out of the gate levers 168 and permits the tray on the rails 149 to enter the gate levers 168, the fingers 72 of the latter tray, while entering between the gate levers, will strike the fingers 171, thereby operating the clutch to connect the cam 133 to power. The latter is thus free to turn through an angle of 180 degrees before being stopped by the dog 135, and during such movement the lifter arms are lowered to the position shown by full lines in Fig. 12. Just before the cam 133 is arrested by the dog 135, the pin 164 strikes the arm 165, releasing the finger 160 and permitting the gate levers 155a of the lower conveyor to open, so that by the time the rails 149 reach their lowermost position, the next succeeding tray on the lower conveyor will be moved forward upon them. As soon as the fingers 72 of the latter tray strike the arms 137, the dog 135 will be lifted, thus releasing the clutch and causing the lifting arms 147 and 148 to raise said latter tray to the upper belt.

The gate levers 168, which are coupled together in the same way as are the gate levers 155, are locked to prevent the entrance of a tray therein, when there are no orders in the machine to be filled. One of the gate levers 168, as best shown in Figs. 12, 16, 18 and 19, is fixed upon a vertical shaft 175, which, at its lower end, is provided with an arm 176 adapted to be engaged by a latch 177. The latch is urged out of engagement with the arm 176 by a spring 177a, but when there are no orders to be filled, is pressed into engagement by a pin 178 projecting from a ratchet toothed accumulator wheel 179. The wheel 179 is provided with a spiral spring (not shown) which is encased in a housing 180 and which serves to turn the ratchet wheel in the direction of the arrow (Fig. 18). The arm 177 is pivoted freely upon the shaft of the ratchet wheel and when the latter turns in the direction of the arrow, withdrawing the pin 178 from engagement with the latch 177, the latter is drawn up by the spring 177a against a stop 176a and clear the arm 176, thus releasing the gate levers 168.

The accumulator wheel 179 is adapted to be released through one tooth spacing in the direction of the arrow as each order impulse is received from the order station 50. To this end, an escapement 181 is employed which is controlled by a solenoid 182 electrically connected with the operating key in the order station, so that at each actuation of the key, the escapement will be oscillated to permit release of the accumulator wheel through one tooth spacing.

Mechanism is provided for turning the wheel 179 back through one tooth spacing as each tray passes out of the gate levers 168, and when the number of trays thus passing through catches up to the orders accumulated in the wheel 179, the latter will have been turned back far enough for the pin 178 to press the latch 177 downward into engagement with the arm 176, thus locking the gate levers with their rear pins 168b in position to block the advance of a succeeding tray.

*Tray loading apparatus*

The tray within the gate levers 168 is arrested, after moving from the position shown by dotted lines in Fig. 18 to that shown by dot and dash lines, by a pair of stop arms 183 fixed to a transverse shaft 184. The extended fingers 72 of the tray strike the arms 183 oscillating the shaft 184 initially through a limited angle, but not sufficiently to permit the fingers 72 to clear said stop arms. Fixed upon the shaft 184 is a three-armed lever 185, to one arm of which is attached a spring 199 under tension and pivotally mounted upon the free end of a depending arm of the lever 185 is a pawl 186 which has limited motion with respect to the lever 185 by reason of a pin and slot engagement therewith. Normally the pawl is urged to the left, as shown in Fig. 18, by a spring. Similarly, a spring pressed pawl 187 is pivotally mounted on a horizontal arm of the lever 185. Mounted upon a stud 188 adjacent the shaft 184 are two levers 189 and 190. The lever 189 is provided with two depending arms 191 and 192, the arm 191 being formed with a shoulder 193 adapted to be engaged by the pawl 186. The arm 192 has pivotally mounted thereon a spring pressed pawl 194 adapted to engage the teeth of the ratchet wheel 179, but normally held out of engagement therewith by a pin 194a.

When the shaft 184 is turned by engagement of the tray finger 72 with the stop arms 183, the pawl 186 engages and slides along the arm 191 until it comes against the shoulder 193, thereby preventing the further rotation of the shaft 184, and thus arresting the tray in a desired receptive position. At the same time the pawl 187 will engage a lug 198 of the lever 190, turning the latter on its fulcrum and thereby pulling a rod 197, which initiates the operation of certain dispensing valves in the containers 54 and 55 respectively (as will be explained presently), thereby causing one or more packages of lump sugar to be deposited from the container 54 into the depression 66 of the tray thereunder and a portion of syrup to be dispensed into the adjacent pitcher 63.

When the dispensing is completed, a rod 195 is pulled, and the lever 189, to which this rod is connected, is thereby turned sufficiently for the pawl 194 to advance the ratchet wheel 179 one tooth spacing and for the shoulder 193 to clear the pawl 186. The tray may now proceed, overriding the arms 183. As soon as the tray has passed, the arms 183 will snap back to their original position, and the pawls 187 and 186 will snap past the arm 188 and shoulder 193 respectively.

Figure 45:
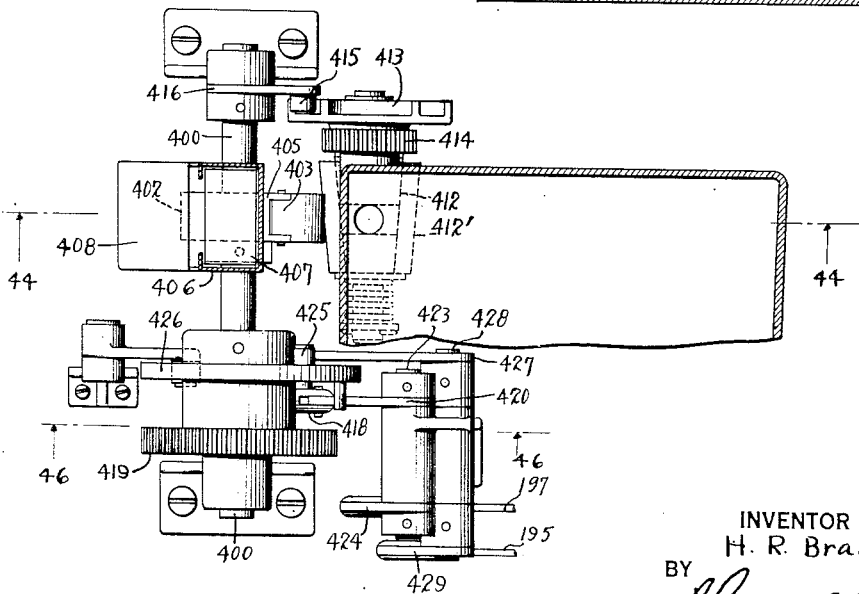
Fig. 45 is a view in horizontal section of the mechanism for operating the dispensing valves shown in Fig. 44.

The mechanism for operating the dispensing valves of the containers 54 and 55 is illustrated in Figs. 44 to 45 inclusive.

A shaft 400 is mounted on suitable brackets in a base frame 401, which supports the containers 54 and 55 (see Figure 44). Secured upon this shaft is a cam 402 of spiral profile with a rounded shoulder 403 connecting the outer and inner ends of the spiral. A shoe 405 is pivotally mounted on the cam directly in front of the shoulder. Immediately above the cam is a vertical chute 406 in the container 54, which serves as a magazine for a column of sugar packages 407. The column of packages normally rests on the cam, and as the latter is turned by the shaft 400, the shoe 405 pushes two of the packages laterally out of the chute 406 into a second offset chute 408, whence they drop by gravity to the tray.

The adjacent syrup container 55 has a sloping bottom wall 409 which leads to a spout 410. This spout 410 is normally closed by a valve 412, which is geared to a Geneva wheel 413. The latter is driven by a pair of rollers 415 carried by a double-armed crank 416 fixed to the shaft 400. The disposition of the rollers is such that when the shaft 400 is turned through a quarter turn, one of the rollers will cause a quarter turn of the Geneva wheel and hence of the valve 412, thereby opening the valve. The valve will then remain open while the shaft is turning through the next half turn of the shaft and will be closed by the other roller during the last quarter turn of the shaft.

The shaft 400 is adapted to be connected by a clutch 418 to a driving gear 419, which in turn is connected to a source of power (not shown). The clutch is of a type similar to that used in connection with the tray-lifting mechanism referred to above, and is normally held in disengaged position by a dog 420 which engages a clutch lever 421. The dog 420 is secured to a shaft 423 and the latter bears a crank 424 (Fig. 18) which is pivotally connected to the upper end of the pull rod 197. Thus, when the rod 197 is pulled by engagement of tray fingers 72 with the stop arms 183, the dog 420 is drawn clear of the clutch lever 421 and the shaft 400 is connected to power. Just before said shaft has made one complete rotation, a pin 425 on a disk 426 carried by the shaft 400 strikes an arm 427 secured to a shaft 428. The latter bears a crank 429 which is pivotally connected to the upper end of the pull rod 195. Thus the pin 425, by striking the arm 427, pulls the rod 195 and turns the lever 189 (Fig. 18) sufficiently to clear the pawl 186 and release the stop fingers 183. On completing one revolution the clutch lever 421 strikes the dog 420, disengaging the clutch and arresting rotation of shaft 400.

The tray, on clearing the stop arms 183, moves forward until arrested by a second pair of stop arms 183a in position to receive the butter and cream from the containers 56 and 57 respectively. (See Fig. 15.) The dispensing mechanism controlled by the stop arms 183a is like that controlled by the stop arms 183, the corresponding parts being indicated with the same reference numerals bearing the suffix "a". No accumulator mechanism is associated with the stop arms 183a, and hence the lever 189a carries no pawl 194.

After the dispensing of the butter and cream is completed, the tray over-rides arms 183a and the tray is next arrested by a pair of stop arms 200 in position to receive the griddle cakes from the machine 52. The arms 200 are similar to the arms 183 and 183a, but are locked in position to arrest the tray by a latch arm 201 which is controlled by a solenoid 202. When the cakes have been deposited on the plate 61 carried by the tray, the solenoid is energized to withdraw the latch 201 so that the tray may now over-ride the stop arms 200. After the tray has cleared the arms 200, a spring 203 acts to restore stop arms to latched position so that they will be in position to arrest the next succeeding tray.

After receiving the order of cakes, the tray is again arrested with the cup 62 directly under the dispensing spout of the coffee dispensing machine 53. In this position, the tray is arrested by stop arms 183b, which are exactly like the stop arms 183a and control corresponding dispensing mechanism indicated in the drawings by like reference numerals bearing the suffix "b".

When the cup of coffee has been dispensed, the tray may proceed out of the kitchen into the main conveyor gallery unless stopped either by a pair of pawls 204 or a par of stop arms 200a, under conditions which will be explained hereinafter. The stop arms 200a are similar to the arms 200 and are locked in stopping positon by a latch 201a controlled by a solenoid 202a. A spring 203a serves to restore the arms to latched position after they have been depressed by a tray riding over them.

The stop arms 204 (Fig. 15) are carried by a pair of levers 204a secured to a transverse shaft 205. A depending arm of one of the levers 204a has pin and slot connection with one end of a link 205a, the other end of which is pivotally connected to a depending extension of one of the arms 200a. A latch lever 206 is connected at one end to the plunger of a solenoid 207 while the opposite end is formed with a notch adapted to catch and hold one of the levers 204a when the latter is raised from the position shown in Fig. 15. Initially the parts are in the position illustrated with the pawls 204 depressed, and the arms 200a are latched in locking position. When the solenoid 202a is energized to release the arms 200a permitting a tray to override them, pawls 204 will be lifted into the path of the tray fingers 72 by reason of the link connection 205a between the arms 200a and the levers 204a. In this raised position they will be held by the latch 206 which moves to latching position under impulse of a spring 206a. The pawls 204 will therefore arrest the next succeeding tray until the solenoid 207 is operated to withdraw the latch and permit the pawls 204 to drop to the position illustrated under impulse of a spring 207a. As long as the solenoid 202a is energized, the stop arms 200a will be free to swing forward as the successive trays pass over them but every time they swing forward, they will raise the pawls 204 to tray stopping position.

The purpose of fingers 200a is to prevent a tray from passing out into the conveyor gallery until certain selective mechanism has been operated to determine at what serving space along the gallery the tray is to be delivered. When the tray has reached the serving space and is about to be transferred thereto from the conveyor, the solenoid 207 is automatically energized to release the succeeding tray. The means controlling the circuits of solenoid 207 and 202a will be described hereinafter.

The token receivers

At each serving space seating in the counter, there is a token slot 208 (Fig. 1) which is in such position as to be covered by a tray when the latter has been moved out to serving position. This token slot leads into a token receiver which is of a type similar to that shown in my copending application Serial No. 204,325, filed May 16, 1927. Each token consists of a flat piece of metal with a certain combination of perforations therein. If two or more service units are employed, the combination of perforations will differ for each unit, and the tokens may be distinguished by number or by some identifying mark to indicate at which counter they may be used.

The casing of the token receiver consists of a pair of spaced plates 209 (Figs. 3, 35 and 36) formed with opposed grooves 210 therein, which, in the normal position of the token receiver, are alined with the slot 208 in the counter. These grooves are adapted to receive the opposite edges of a token 211. A spring pressed arm 212 is adapted to be engaged by the token as the letter is pushed into the slot 208. Slidable transversely to the place of the token is a frame 213 bearing a plate 213a. The latter is fitted with projecting pins 214 arranged in a combination corresponding to that of the perforations of the token. The slide frame 213 has pin and slot engagement with an arm 215 which is fixed upon a shaft 216 journaled in the plates 209 of the token receiver. The arm 212 is loosely pivoted on the same shaft and is spring connected to the arm 215 so that when depressed by the token, it will yieldingly force the slide plate 213 toward the token. When a proper token has been inserted, the pins 214 will enter the perforations therein and lock the token in the receiver. If, on the other hand, a token with a different combination of perforations is inserted, the pins will fail to register with the perforations, but will strike the body of the token and hence will fail to lock the token fast, so that as soon as it is released, the token will be ejected by the recoil of the spring pressed arm 212.

Fixed upon the shaft 216, outside of the receiver casing 209, is a trip lever 217 (Fig. 36). Pivoted on a cross beam 87, which supports the counter, is a lever 219 having one arm thereof normally lying in the path of the trip lever 217, while the other arm is fitted with a button 220 of insulating material which rests upon one of a pair of spring contact fingers 221. When a proper token is inserted in the receiver, the lever 217 snaps past the lever 219, oscillating the latter on its fulcrum and thereby causing a momentary engagement of the fingers 221 with each other. An electric circuit is thus momentarily closed whenever a proper token is inserted in the receiver, and certain mechanism is set into operation which will be described presently. If a wrong token is inserted, the pins 214 will prevent the shaft 216 from turning far enough to trip the lever 219.

The token receiver casing 209 is fixed upon a shaft 224 which is journaled in a suitable bearing carried by a cross bar 87. An arm 225 is secured to the shaft 224 (see also Fig. 23) and projects into the path of a roller 226 of a tray delivery mechanism, which will be described in detail hereinafter. A spring 227 normally holds the token receiver in the position shown by full lines in Fig. 35, but when a tray is delivered to the serving space over the token receiver, the roller 226 carried by the tray delivery mechanism will strike the arm 225 and swing the receiver to the position shown by broken lines. An arm 228 of the lever 217 will then strike a pin 229 (Fig. 36), thereby causing the lever 215 (Fig. 34) to withdraw the pins 214 from the token and permit the lever 212 to eject the token from the grooves 210. These grooves will now be alined with a chute 229 (Figs. 3 and 21) which will convey the token by gravity to the lower run of the conveyor belt 108.

At each side of the lower run of the conveyor belt is an angle member 230, and these angle members with the belt form a trough which serves to retain the tokens thereon. The belt carries the tokens forward until they reach a point in the kitchen (Figs. 12 and 20) where a deflector plate 231 sweeps the tokens off the belt into a lateral chute 232 which leads into a receptacle 233. The latter may be locked so that access thereto cannot be had by an unauthorized person. It will be observed from the description given above that the token is held in the receiver until the tray is delivered to the counter so that in case of any dispute with a customer over failure to receive a tray, the manager may see whether the customer has actually deposited a token. When the tray is returned to the conveyor, the roller 226 will release the lever 225 and permit the spring 227 to draw the token receiver back to the position shown by full lines in Fig. 34.

The deposition of a token results in elevating a pair of stop arms 235 and 236 (Figs. 21, 25, 26 and 27) in front of the serving space in which the token is deposited so that the next loaded tray that comes along will be arrested by engagement of its extended fingers 72 with said stop fingers, whereupon the tray delivering mechanism will automatically slide the tray thus arrested out upon the said serving space. However, the raising of the stop fingers 235 and 236 is not directly controlled by the deposition of the token as this would favor the customers nearest the kitchen at the expense of those further away. Thus, a customer remote from the kitchen would have to wait until all intervening customers had been served before a tray would reach the stop fingers set up by his token. It is preferable to have the customers served in the order in which they deposit the tokens rather than in the order of their location, and to this end a tray routing controller is provided for raising the stop fingers at the different serving spaces in the order in which the tokens are deposited, but only one pair of fingers is raised at a time so that a tray will not be stopped by intervening fingers, but will continue to the serving space to which it is routed before the next set of fingers is raised.

Tray routing controller

The tray routing controller is preferably located in the kitchen as indicated at 239 in Figs. 1 and 2. The controller is illustrated in detail in Figs. 37 to 41. It is provided with a base 240 which supports a fixed upright shaft 241. Mounted thereon is a cylinder or pin drum 242. Projecting through the periphery of the drum are annular rows of pins 243, there being a row for each serving space in the counters. The number of pins required in each row depends upon conditions of service, but, as illustrated, each row has as many pins as there are serving spaces in the counter.

A detail view of one of the pins is shown in Fig. 42. Each pin rides in a bore through the wall of the drum, which bore is provided with an annular recess 244 to receive a split ring 245 of spring wire. The pin is formed with two annular grooves 246 and 247 adapted to be engaged by the ring to hold the pin in either of two positions. Normally, the pin occupies the position illustrated in Fig. 42, with its inner end lying flush with the inner face of the drum, but it may be pushed inward so that the outer groove 247 is engaged by the ring 245.

A hub 248, which carries the drum 242, is mounted in ball bearings 249 at the lower end of the shaft and has a ratchet wheel 250 secured thereto. A solenoid 251 (Fig. 41) mounted on the base 240 adjacent the ratchet wheel has a plunger 252 which is pivotally connected to one arm of a bell crank lever 253 fulcrumed on the base, the other arm of which carries a pawl 254 held in yielding engagement with the teeth of the ratchet wheel by a spring 255. At each actuation of the solenoid, the pawl 254 advances the ratchet wheel through one tooth spacing, the wheel being held in such advanced position by a spring pressed dog 256. The angular spacing of the ratchet teeth corresponds to the angular spacing of the rows of pins 243 so that at each actuation of the solenoid 251 the drum 242 will be turned through an angle equivalent to the spacing of one row of pins.

Above the solenoid 251 is a frame 258 which supports a vertical row of pusher fingers 259, there being a finger for each annular row of pins 243. Each finger 259 is adapted to be individually operated to push in the pin 243 which at the moment is alined therewith. A plurality of solenoids 260 are carried by the frame 258, there being a solenoid for each finger 259, and hence for each serving space in the counters. The plunger of each solenoid 260 is pivotally connected to a lever on which a pusher finger 259 is pivotally connected. As shown in Fig. 38, the levers 261, actuated by the outer rows of solenoids, are fulcrumed on vertical posts 262, while levers 263 actuated by the inner rows of solenoids, are shorter and are fulcrumed on vertical posts 264. The leverage is such, however, that all the pusher arms will be moved through the same distance with equal movements of the solenoid plungers. The rows of solenoids are so staggered that connections to the levers from the plungers of the rear solenoids will pass between the solenoids of the front rows.

Each pusher finger 259 has a rearward extension 266 connected by a spring 267 to a post 268, and this extension is so angled that the forward end of the finger is normaly pressed laterally against a post 269. Each solenoid 260 is connected in series with the solenoid 251 so that when solenoid 260 is energized to move a pusher arm forward, the solenoid 251 will be simultaneously actuated to rotate the pin drum 242 through one pin spacing. Thus, the pusher finger, as it advances and pushes in a pin 243, will be swung laterally by a frictional engagement with the pin against a stop bar 270, which also is slotted and acts as a guide for the fingers. The forward end face of the pusher finger is curved to conform to the arc of travel of a pin, and is broad enough to insure contact with the pin while the latter is being carried angularly by the drum. But, immediately upon withdrawal of the pusher finger, the latter will be swung laterally by the spring 267 to the proper position for engaging the next pin in the annular row.

Within the pin drum 242 is a frame 275 mounted to turn in ball bearings 276 on the shaft 241. A spiral spring 277 (Fig. 37) secured at one end to the fixed shaft 241 and at the other to the frame 275, urges the latter counterclockwise, as viewed in Fig. 38. A stop arm 278 carried by the frame 258 is adapted to engage a pin 279 on the frame 275 so as to limit rotation of the frame in response to the spring pressure. The pin 279 carries a finger 279a of insulating material (Fig. 40) which normally bears against the outer one of a pair of spring contact fingers 278a and 278b in a circuit controlling the solenoid 202a, so that when the pin 279 engages the stop 278, the contact fingers will be spread apart and thus interrupt the circuit of the solenoid 202a (Fig. 15). As soon, however, as the frame 275 is moved carrying the pin 279 away from the stop arm 278, the fingers 278a and 278b will contact and close said circuit, permitting the trays to move out of the kitchen and into the main conveyor gallery, at intervals controlled by the solenoid 207 unless arrested by the fingers 200a.

The frame 275 supports vertical rows of solenoids 280, which, through levers 281 and 282, are operatively connected to pusher fingers 283 respectively. When the frame 275 is in its normal position, as shown in the drawings, the pusher fingers 283 are opposed to and substantially alined with the pusher fingers 259. The pusher fingers 283 serve to push back the pins 243 after they have been pushed in by the fingers 259. The fingers 283 are guided at their outer ends through openings in a vertical guide rail 284, but each finger is normally held in the retracted position shown in Figs. 37 and 38 by a spring 285. The arrangement of the solenoids 280 is similar to that of solenoids 260, and the staggered disposition of the solenoids whereby connections may be made from the rear rows to the levers 281 and 282 is illustrated in Fig. 39. It will be observed that a plunger 286 of a rear solenoid has a connecting bar 287 which passes through an opening in a supporting frame 280' and between the forward solenoids to reach the levers 281 and 282.

Immediately adjacent the rail 284, on the side opposite the pusher fingers 283, is a vertical bar 290 of insulating material which carries a plurality of electric contact members 291, there being one for each annular row of pins. The first pin that is pushed in and revolved by simultaneous actuation of a solenoid 260 and the solenoid 251 will establish an electric circuit by engagement with a contact member 291, and at the same time will carry the column 290 forward, thereby moving the frame 275 against the tension of the spring 277. Thereafter, successive operations of the solenoid 251 will cause the frame 275 to rotate step by step with the cylinder. The solenoid 251 is actuated only when one of the solenoids 260 is actuated, and hence with each successive step of the cylinder a pin 243 of the next successive vertical row is pushed in. When a solenoid 280 and its finger 283 is actuated to push out the pin engaging the column 290, the frame 275, under impulse of the coil spring 277, will snap back and engage the pin projecting inward from the next vertical row and another electric circuit will be established by engagement of said pin with a contact 291.

Leads 295 from the solenoids 260 (see Fig. 38) are carried out to binding posts 296 respectively supported in the panel board 297 and thence suitable connections are made to power lines which are respectively interrupted at the token controlled contact fingers 221, previously referred to. Thus, whenever a proper token is inserted in a slot 208 in the counter, a corresponding solenoid 260, and with it the solenoid 251, are connected to power.

Leads from the contact points 291 are led through a conduit 299 to individual binding posts 300 supported in a disk-shaped panel board 301 fixed to the cover of the spiral spring 277. Leads 302 from the solenoids 280 are similarly led through a conduit 303 to binding posts 304, also carried by the panel 301. Wires 305 and 306 from the binding posts 300 and 304 respectively lead through a central ring 307 carried by the panel 301 and thence into a fixed conduit 308. The mouth of the conduit is axially alined with the shaft 241, but is spaced therefrom, and sufficient slack is provided in the wires between the ring and the mouth of the fixed conduit 308 to permit the wires to twist about each other as the frame 275 turns on its axis. The frame 275 will seldom turn through more than a few degrees and can never be turned through more than one complete rotation, and the slack in the wires 305 and 306 will be ample to take care of the maximum twisting to which they may be subjected. The conduit 308 conducts the wires down between the solenoid 260 to the bottom of the frame 258, thence they run to binding posts 296a on a panel board 297a. The wires from the contacts 291 lead respectively to solenoids 320 (Figs. 25 and 26) which control the stop fingers 235 and 236, so that whenever a circuit is closed by grounding a contact 291 through a pin 243, a corresponding solenoid 320 is energized and remains energized as long as the pin remains in engagement with said contact.

There is a solenoid 320 for each serving space or seating, the solenoid being mounted within the conveyor gallery near the forward end of the serving space, as indicated by dotted lines in Fig. 23. Actuation of the solenoid 320 serves to raise the stop fingers at opposite sides of the conveyor into the path of the tray fingers 72. As shown in Figs. 23, 25, 26 and 27, the solenoids 320 are carried on the cross beams 87 which are fixed upon the uprights 85. The plunger 322 of the solenoid 320 is connected to one arm 323 of a bell crank lever, the other arm 324 of which is connected at its free end by a link 325 to a crank arm 326 fixed on a transverse shaft 327. This shaft, which extends transversely beneath the upper reach of the upper conveyor belt 108, is journaled in suitable bearings in the uprights 85 of the conveyor gallery (see also Fig. 21). A crank 328, which is a companion of the crank 326, is fixed upon the shaft 327 at the opposite side of the conveyor belt, and the outer ends of the cranks 326 and 328 provide journals for a shaft 329.

Fixed upon the shaft 329 adjacent the arm 326 is the stop finger 235, while the companion stop finger 236 (Figs. 21 and 27) is fixed upon the shaft 329 adjacent the arm 328. The latter finger is formed with a stop member 332 which normally has sliding engagement with an inner face of the cross beam 87, being urged thereagainst by a spring 333. A pair of spring contact fingers 334 secured to but insulated from the cross beam 87 are adapted to be bridged by a contact blade 335 carried by but insulated from the stop finger 236. However, the blade is normally held clear of the contact fingers 334 by the spring 333. When the solenoid 320 is actuated, the stop fingers are raised, so that when a tray is carried along by the conveyor over the stop fingers, the tray fingers 72 will strike the stop fingers and the tray will be thereby arrested. At the same time, the stop fingers will be oscillated by the tray, and the shaft 329, to which they are attached, will be turned on its axis against the pressure of spring 333, causing the blade 335 to bridge the contact fingers 334. The latter are connected to one of the solenoids 280 of the tray routing mechanism, so that when they are bridged, said solenoid will be connected to power, operating a finger 283 to push out the pin 243 which caused the actuation of solenoid 320. The latter solenoid is thus de-energized, and the stop fingers are then permitted to drop to their original position. However, before this happens, operation of mechanism for moving the tray laterally off the conveyor is initiated by oscillation of the shaft 329.

The solenoid 207 (Fig. 15) is energized whenever any of the solenoids 280 (Fig. 43) are energized, and permits the pawls 204 to drop and thus permit the passage of a tray.

A crank arm 337 (Figs. 21, 23, 25 and 26) is fixed upon the shaft 329 and has pin and slot connection with a pull rod 338. Owing to said slot connection, the rod 338 is not affected by raising of the fingers 235 and 236, but when the fingers are struck by a tray, causing the shaft 329 to oscillate, the arm 337 is also oscillated, pulling the rod 338 and thereby initiating actuation of the tray delivering mechanism.

Tray delivering mechanism

Within each counter, under each serving space, is a pair of fixed guide rods 360 (Figs. 3, 21 and 24) which extend in the gallery and are supported at their inner ends in the channel beams 321, and at their outer ends in a rail 359 (Fig. 3) which forms the outer margin of the counter. Mounted to slide on each pair of rods is a cross head 361 (see also Fig. 23) provided at each end with an upwardly projecting finger 362 adapted to engage one of a pair of recesses 363 formed in each of the cleats 69 and 70 of the trays. These fingers 362 serve to carry the trays to and from the conveyor belt. The fingers which carry the tray to and from the right-hand counter, as viewed in Fig. 21, are normally alined with the recesses 363 near the right-hand side of the tray, while the fingers which carry the trays to and from the left-hand counters are alined with the recesses 363 near the left-hand side of the tray (see also Fig. 24).

Between the upper and lower run of the upper belt and extending lengthwise on the belt, is a cam shaft 364 journaled in brackets 364' carried by cross brackets 86' of the conveyor gallery. This shaft, as shown in Figs. 7, 8 and 10, is driven through suitable gearing 365 by a driving gear 366 keyed upon the shaft 104. Mounted upon this shaft are a number of cams, 371 and 371a (see also Figs. 21, 22 and 30), there being a cam for each seating. The cams 371 for operating the delivery mechanism to and from the right-hand counters are of different form from the cams 371a used in connection with the left-hand counters. Each cross head 361 is connected by a rod 368 to the free end of the cam operated lever. The levers 369, which operate the right-hand cross heads, are of the same shape as the levers 369a, which operate the left-hand cross heads, but are in opposed positions, as shown, due to the stroke required to actuate the cross heads. Each cam is normally idle, but may be individually connected to the cam shaft 364 by a suitable clutch 376.

Referring first to the cams 371, each clutch may be thrown into engaging position by pulling a rod 338 to withdraw a dog 378 (Fig. 21) from a trip lever 379 which actuates the clutch. After the cam has turned through an angle of 180 degrees, the trip lever is caught by a second dog 380 and is thereby moved to release the clutch and arrest the cam. A roller on the arm 369 engages a groove 382 in the face of the cam 371, which causes the arm 369 to move the cross head outward upon the right-hand counter. When the dog 380 is withdrawn from the trip lever 379 by mechanism which will be described hereinafter, the clutch will be engaged again and the cam will turn through another half revolution, withdrawing the cross head to its original position, and when the cam completes the latter half revolution, it will be arrested again by engagement of the dog 378 with the trip lever 379. A spring pressed arm 383 carries a roller 384 which runs against the periphery of the cam, and the latter is of such form as to receive a forward thrust under impulse of the spring pressed arm just prior to each retraction of the trip lever, thus momentarily over-riding the clutch and permitting ready disengagement thereof.

As shown in Fig. 30, each cam 371a is adapted to be connected to power by a similar clutch 376. A pull rod 338 is operatively connected by a dog 378a which normally holds a trip lever 379a in de-clutching position, and diametrically opposite the dog 378a is a second dog 380a adapted to engage the trip lever 379a. The arm 369a bears a roller which engages a groove 382a in the face of cam 371a and is thereby oscillated to move a cross head to and from the left-hand counter. The arms 369 and 369a are fulcrumed on studs 370 and 370a projecting forwardly or to the right, as viewed in Fig. 23, from the cross brackets 86' of the conveyor gallery frame.

Whenever a tray is arrested by engagement of its fingers 72 with the stop fingers 235 and 236, it is desirable to lift the tray off the conveyor, prior to its delivery to a serving space so as to prevent excessive drag on the conveyor or the possibility of slewing the tray, due to unequal friction on opposite sides of the conveyor belt. To this end, a pair of bell crank levers 338a fixed to a shaft 338' are pivotally connected to a pair of freely mounted bell-cranks 338b by cross bars 390. The latter is centrally offset to pass under the upper run of the belt 108 and the supporting rails 128. Depending arms of the bell cranks 338a and 338b are also pivotally connected by a bar 390'. A crank arm 391 is secured to the shaft 338' and is connected by a rod 392 to a lever 393 which engages a groove in the cam 371. Thus, as soon as a clutch is thrown and the cam 371 begins to turn, the rod 392 is pulled down, causing the bell cranks 338a to turn and lift the bars 390. The latter have lateral flanges (see Fig. 23) which engage the cleats 69 and 70 on the bottom of the tray, raising the tray clear of the belt and alining it with the counter so that when it is slid forward by the cross head, the body of the tray will ride upon the counter plate 89 and the cleats 69 and 70 will pass under the counter plate, while the pins 71 will be guided in the slots 94 (Figs. 23 and 24) formed in the counter 89.

When the pull rod 338 is operated, as described above, to connect the cam 371 to power, the arm 369 is actuated to slide the cross head 361 on the rods 360, and the tray is moved out upon the right-hand counter by engagement of the fingers 362 with the cleats 69 and 70, the roller 226 carried by the cross head strikes the arm 225 (see Figs. 3 and 35) of the token receiver, tilting the latter to such position as to discharge the token therein into the chute 229. When the tray reaches the limit of its outward movement, the right-hand finger 72 strikes the rail 359 and is pushed inward. The left-hand finger 72, however remains in extended position until the tray is pushed out from the counter, when it also is pushed inward by a slide 394 (see Figs. 21 and 24) pivotally connected to a lever 395 fast on a shaft 394' journaled in the uprights 85. A lever also fixed on the shaft 394' is adapted to be struck by an extension of the rod 368 mounted on the free end of the arm 369 when the cross head is returned, thus desirably rocking the shaft 394', the cam 382 being arranged to overthrow the lever 396 on the return stroke just enough to cause retraction of the left-hand finger 72 as it centralizes the tray 60 on the conveyor belt 108. Thus, after a tray has been delivered to the counter, and then returned to the conveyor belt, the fingers 72 are both withdrawn and will not engage any other stop fingers that might be raised along its course out to the wash room.

The return of the tray to the conveyor is controlled by the stool 93. As long as the stool is occupied, the tray will remain on the counter, but as soon as the customer leaves the stool, the tray will automatically return to the conveyor. However, the return control mechanism is normally inactive and so remains until a tray has been delivered to the counter and the stool has been occupied. Thus, when a customer inserts a token, it is not necessary for him to take his seat if he does not choose to, until the tray has been delivered to his serving space, but thereafter, if he occupies the seat, he must remain seated until he has finished his meal, because the moment he arises, the return mechanism will be rendered operative to return the tray automatically to the conveyor. The return may not take place immediately, but will occur as soon as a space is clear for the tray on the conveyor, as will be explained hereinafter.

The return control mechanism for a right-hand counter differs somewhat from that for a left-hand counter, and the mechanism for the right-hand counter, which is best illustrated in Figs. 3, 21, 28 and 29, will now be described.

Each stool comprises a seat mounted on a vertical post 441 which slides in a hollow column or pedestal 442. Normally, a spring 443, within the hollow column, holds the stool in elevated position, but when the seat is occupied, the spring is compressed slightly, permitting the seat to rest upon the top of the column. In the base of the pedestal is mounted a bell crank lever 444, one arm of which is connected by a link 445 to the post 441. The other arm of the lever 444 is connected by a rod 446 to one arm of a bell crank 447 mounted in the base of the conveyor gallery. The rod 446 is protected by a housing 448. A rod 449 preferably flexible connects the other arm of the bell crank 447 to an arm 450 of a three-armed control lever 451 (see Figs. 28 and 29).

This control lever 451 is fulcrumed on a stud 452. A second arm 453 of the lever 451 carries a pivot pin 454, on which is pivotally mounted a trigger 455 and also a catch member 456. The shoulder of the catch member is normally pressed by a spring 457 against a pin 458 on the trigger 455, thus providing a yielding connection between the trigger and the catch member, the purpose of which will appear presently. A spring 459 connects the trigger 455 and the lever 451, urging the trigger to the position shown in Fig. 28, with a heel 460 of the catch member resting on the hub of the lever 451. Mounted to turn freely on the stud 452 is a latch lever 463. One arm of this lever is formed with a notch 464 engaging a lug 465 on the end of an arm 466. This arm (see Fig. 21) is fixed upon a shaft 467, upon which the clutch dog 380 is secured. The shaft is journaled in an arm 468 projecting from a bracket 364' (see Figs. 22 and 23). A spring 463' (Figs. 28 and 29) exerts a downward pull on the latch lever 463, and a spring 469 exerts a downward pull on the arm 453 of the control lever 451, tending to move the third arm 470 of the control lever against the rod 471 as a stop, but being normally prevented from doing so by the spring 443 on the seat post which tends to hold the control lever in the position shown in Fig. 28.

As long as the delivery mechanism has not delivered a tray to the counter, the seat may be depressed and retracted without releasing the return control mechanism. The latch lever 463 has an angled arm 473 which bears a pin 474 adapted under certain conditions to engage the heel 460 of the catch member. As long as the delivery mechanism remains in the normal retracted position illustrated in Fig. 21, the seat 93 may be moved up and down without affecting the latch lever 463 as the heel 460 will move idly by the pin 474.

When the cam 371 operates to deliver a tray to the counter, a pin 475 carried by said cam strikes the trigger 455 and swings it about its pivot 454 against the tension of the spring 459. The catch member 456 tends to follow the movement of the trigger, but if the seat is in its raised or unoccupied position, it is unable to do so because the heel 460 will catch under the pin 474. However, when the seat is depressed, the arm 450 is free to rise under the impulse of spring 469, swinging the pin 454 forward and throwing the heel 460 clear of the pin 474. The parts will then occupy the position shown by full lines in Fig. 29. Now, when the occupant leaves the seat and permits it to rise under impulse of the spring 443, the arm 450 will be thrown down to the position shown by broken lines in Fig. 29, and the heel 460 will strike the pin 474, raising the latch lever 463 so that the notch 464 clears the lug 465 and permits the lever 466 to swing to the broken line position. A spring 476 (Fig. 21) acting on the arm 466 draws the lever to the position shown by broken lines in Fig. 29, withdrawing the dog 380 from the clutch lever 379. The cam 371 is thereby connected to power and turns through a second half rotation when it is arrested by engagement of the clutch lever 379 with the dog 378. After the pin 475 clears the trigger 455, the latter returns to normal position, drawing the heel 460 clear of the pin 474. Fixed upon the shaft 467 is an upwardly projecting arm 477. A pin 479 carried by the cam bears against the arm 477, restoring the arm 466 to normal position and permitting the latch lever 463, under impulse of the spring 463', to engage the lug 465. The parts are thus restored to the normal position shown in Fig. 28.

Similar mechanism, but modified for operation on the other side of the conveyor gallery, is employed for controlling the cam 371a. This mechanism is illustrated in Figs. 30 and 31, and corresponding parts are designated with the same reference numerals as those applied to the control mechanism for the cam 371, but are distinguished therefrom by the suffix "a". When it is understood that the parts are reversed, and correspondingly modified to allow for reverse direction of motion, the operation of the mechanism should be apparent without further detailed explanation.

Serving space gates

Referring to Figs. 21, 23 and 24, it will be observed that in front of each serving space there is a gate 500 which swings on a hinge pin or shaft 501 at the top of the gate. The gate is arranged to open inward to allow the delivery or return of the tray from or to the conveyor belt and is closed immediately upon the passage of the tray therethrough, so that a customer cannot reach into the conveyor through the door as another tray is passing. The opening and closing of the gate is controlled by the groove in the cam 371 or 371a, as the case may be, which lifts the trays off the conveyor. The cam lever 393 is fixed upon a shaft 503. An arm 504 secured to the shaft 503 is pivotally connected at its outer end to a vertical slidable rod 505 (see also Fig. 22). A rack 506 is secured to the upper end of the rod and meshes with a pinion 507 keyed to the shaft 501. Thus, at each half turn of the cam while the lifting bars 391 are being raised and before the slide head begins to move, the rod 505 is raised to turn the shaft 501 and open the gate 500. The gate opening mechanism for the gates of the left-hand counter is the same as that for the right-hand counter.

To guide the trays through the conveyor gallery and prevent them from skewing thereon, guide rails 510 (Figs. 21 and 24) are provided at each side of the belt and are of such height as to engage the side rims of the trays. However, the guide rails are slightly spaced from the tray so as to allow perfect freedom of movement. The guide rails are made in sections, there being a vertical slidable section in front of each serving space. Each slidable section is suspended from a horizontal rod 511 and has fixed thereto guide rolls 511a. The rod 511 and the guide rolls 511a slide in grooves 512 formed in a frame member 513 of the conveyor gallery. The gate 500 is formed at each end with a flange 514, shaped at its lower end to form a cam groove 515. The rod 511 is engaged by the cam grooves 515 when the gate is swung open and is thereby moved up to raise the guide bar section so that a tray may pass thereunder and is also positively moved down to a normal position when the gate is closed.

Interlocking block switch system

Means are provided to prevent the return of the tray to the conveyor until there is a free space thereon to receive it. Trays on the conveyor, whether loaded or empty, have right of way over trays that are being returned from the counters. In this connection, it must be borne in mind that the conveyor belt travels continuously and moves through an appreciable distance, while an empty tray is being moved back upon the lifting bars 390 and then lowered to the conveyor belt. Hence, an interlocking control system is provided which operates considerably in advance of each tray on the conveyor. This control system is illustrated in Figs. 32, 33 and 34.

Mounted on vertical shafts 550 at each side of the conveyor are feeler arms 551 provided with pins 552 at their free ends, which normally lie in the path of the trays (see also Figs. 21, 23 and 24). There is a feeler between each adjacent pair of serving spaces, and as the spaces on one counter are staggered with respect to those on the other, the feelers on opposite sides of the conveyor are correspondingly staggered. The opposite feelers, however, are interconnected in pairs, as shown in Fig. 32. A link 553 connects a crank 554 on one shaft 550 to a corresponding but reversely disposed crank 554 on a diagonally opposite shaft 550, the connection being such that as one of the feelers is swung outward by engagement with an advancing tray, the diagonally opposite feeler will also be swung outward.

Each shaft 550 is provided at its lower end with a crank arm 556 (see also Fig. 22) which carries a pin 557. Each pin 557 is pivotally connected to one of a series of superposed locking plates 560. These plates are arranged in two groups, one at each side of the gallery, and they slide in guides 561 with four layers of plates in each group. Each plate 560 is long enough to embrace three pins 557 ahead of the pin to which it is pivoted (see Fig. 34), but is formed with slots 562 to clear said three pins so that it is actuated only by the pin near its rear end to which it is pivotally connected. Thus, whenever a shaft 550 is turned by the advance of a tray on the conveyor, a plate 560 will be pulled rearward thereby at each side of the gallery and will be held in such position until the tray has cleared the pin 552 controlling said shaft and also the pin controlling the diagonally opposite shaft 550.

As the tray progresses, the shafts 550 will be successively turned and the pins 557 will be successively actuated to withdraw the respective slide plates to which they are pivotally connected. The purpose of such movement of the plates is to lock the arms 466 and 466a which control clutch dogs 380 and 380a and hence prevent the return of the trays to the conveyor. To this end, opposite each lever 466 and 466a there is a locking arm 565 (Figs. 22 and 32) which is adapted to be moved into the path of the arm 466 to prevent the latter from swinging on its fulcrum in response to the pull of the spring 476. The arm 565 is spring connected to one arm of a lever 566. The other arm of the lever 566 bears a pin 567 which engages normally alined slots 568 in the superposed plates 560. A spring 569 urges the lever 566, and hence the arm 565, to the position illustrated in Fig. 32, in which position the pins 567 engage the forward end of the alined slots 568. Each plate 560 engages four pins 567, three of which are in front and one to the rear of the pin 557, to which the plate is pivotally connected, so that when a plate is pulled back by the approach of the tray, the three arms 565 next ahead and the one to the rear at each side of the gallery will be swung to locking position. Thus, a tray on the conveyor is given right of way over cross traffic, and the approach of a tray on the conveyor is heralded by the plates 560 at least three serving space lengths in advance of the on-coming trays, and traffic from the serving spaces to the conveyor is successively blocked until the tray has passed by them. The pin 567 immediately to the rear of each tray actuated pin 557 blocks the return of a tray from the adjacent serving station until the tray on the conveyor has cleared said station. The foremost locking arm 565 in advance of an on-coming tray may encounter an arm 466, which has already been swung outward to permit the return of a tray to the conveyor, in which case the spring connecting the arm 565 to the lever 566 will yield. Such a condition must necessarily take place at least three serving spaces ahead of the tray already on the conveyor so that there will be ample time for the returning tray to take its place on the conveyor without danger of being overtaken.

While collisions between trays being returned to the conveyor and trays already on the conveyor are avoided by the mechanism just described, a further interlocking mechanism must be provided to prevent two trays from being simultaneously returned to the conveyor from opposite serving stations. Adjacent each cam 371 there is a feeler arm 570 secured upon the shaft 452 (see Figs. 21, 22, 23 and 30). The shaft 452 extends rearwardly (toward the kitchen) to a point adjacent the next cam 371a and carries a companion feeler arm 571. The feeler arms 570 have pin and slot connection with the arms 477, and whenever a clutch dog 380 is operated to connect a cam 371 to power, the associated arm 570 swings downward and carries with it its companion arm 571. On the opposite side of the conveyor gallery, a similar feeler arm 570a has pin and slot engagement with each arm 477a and is secured upon the forward end of each shaft 452a and in alinement with the opposite feeler arm 571, while at the opposite or rear end of each shaft 452a is secured a companion feeler arm 571a which is alined with the opposed feeler arm 570. These opposed feeler arms are so disposed that when one drops or swings downward it will block the opposed feeler arms and prevent the latter from dropping downward. Because each feeler arm has a companion which moves with it, and because the pairs of arms on one side of the conveyor are staggered with respect to those on the other, it follows that the dropping of one pair will block the dropping of two opposed pairs of feeler arms. The clutch dogs 380 and 380a will not release the clutch arms 329 and 329a respectively unless the feeler arms associated with them can drop. Hence when a dog 380 releases a cam 371, the dogs 380a of the next adjacent cams 371a to the front and rear respectively will be locked against release. Similarly, the release of a cam 371a will block the release of the next adjacent cams 371 to the front and rear respectively. By this means, collisions between trays returning from opposite serving stations are avoided.

The used trays are carried out by the conveyor 108 into the wash room, where they, together with the dishes they carry, are washed. The clean trays are supplied with clean dishes, etc., arranged as shown in Fig. 4, and are then placed on a shelf 99' (see Fig. 7) forming part of the housing 99. The fingers 72 are extended and the trays are then slid upon the lower conveyor belt 112 under the overhanging flanges of a pair of guide rails 580.

*Tray-positioning control mechanism*

It is essential that the trays be placed on the conveyor 112 with the cleats 69 at the leading end and with both of the fingers 72 extended, and control means are provided to arrest a tray unless these essentials have been properly carried out. These control means are illustrated in Figs. 7, 8 and 9.

Two opposed pairs of gate levers 581 and 582 are provided, which must be pushed open by the tray before it may proceed along the conveyor. The levers of each opposed pair are coupled together like the gate levers at the opposite end of the conveyor, but, unlike them, each lever has only a single arm with an upright pin at the free end thereof. Springs 583 and 584 respectively (Figs. 8 and 9) serve to urge the gate levers into closed position with the pins lying in the path of the trays. Secured to one of the gate levers 581 is a finger 585 which projects inwardly beneath the upper run of the belt 112. Similarly, a finger 586 is secured to and projects inwardly from one of the gate levers 582. A locking sector 587 is freely mounted upon a transverse shaft 588 and is connected by a spring 589 to a crank 589' secured to said shaft. When the sector 587 is swung downward by turning of the shaft 588, it will bear against the outer edge of the finger 585 and thereby lock the gate levers 581 in closed position. Normally, however, the sector is held in raised position by a pin on the crank 589' so that the gate levers 581 are normally unlocked. The gate levers 582, however, are normally locked in closed position by a latch arm 590 which engages the finger 586. The arm 590 is secured upon a transverse shaft 591. The shafts 588 and 591 are provided with crank arms 592 and 593 which are linked together by a bar 597 so that whenever the sector 587 is swung to locking position, the latch arm will release the finger 586, and whenever the finger 586 is latched, the finger 585 will be released. Centrally pivoted on an extension of the bar 597 is a cross bar 598 (see also Fig. 10) which bears at each end against a trip arm 599. The trip arms are fulcrumed on opposite sides of the conveyor belt in position to engage the tray fingers 72 provided said fingers are extended. Hence, when said fingers engage and over-ride the trip arms 599, the cross bar will be moved forward or to the left, as viewed in Fig. 9, and the shafts 583 and 591 will be turned.

If, now, a tray is presented to the gate mechanism with the proper end forward and both fingers 72 extended, the rounded corners of the leading edge of the tray will spread apart the unlocked first gate levers 581, and just before it reaches the second gate levers, the latter will be unlatched by engagement of fingers 72 with the trip arms 599. When the gate levers 581 swing open, the finger 585 swings across the path of the sector 587 so that the latter cannot move to locking position by turning of the shaft 588, and the spring 589 is obliged to yield. The tray now proceeds by frictional engagement with the belt 112, over-riding the stop fingers 599, thereby causing the bar 597 to rock the shafts 588 and 591, the former swinging the arm 589 away from the arrested sector 587 and the latter unlocking the finger 586. The further progress of the tray spreads open the second pair of gate levers 582. As the tray clears the first pair of gate levers, the latter are swung to closed position by the spring 583, withdrawing the finger 585 from under the sector 587, which now swings into locking position under impulse of spring 589. The first gate levers are thus locked and will prevent the entrance of another tray until the preceding tray has cleared the second gate levers. When the latter have been restored to closed position by the spring 584, the latch arm will be free to swing up and latch the finger 586, and, under urge of a spring 600 connected to a crank arm on shaft 591, the bar 597 will move rearward or to the right, as shown in Figs. 7 and 9, unlocking the forward gates.

If a tray is presented to the gate mechanism with the wrong end forward and the fingers 72 extended, the latter, by engaging the trip arms 599, will move the sector into locking position, and the gate levers 581 will bar the tray. If, on the other hand, the fingers 72 are not extended, the tray will be stopped no matter which end is leading, because there will be no engagement of the trip arms 599, and hence the second gate levers will not be unlocked.

The trip arms 599 are not connected to move together, but may be swung individually in either direction from the vertical position. Normally, they are maintained in upright position by light springs 601. If a tray is presented with only one finger 72 extended, only one of the trip arms 599 will be swung forward, with the result that the cross bar 598 will merely turn about its central fulcrum, swinging the other trip arm rearward. The bar 597 will not be pushed forward to unlatch the second gate levers, and the latter will bar the tray. The result will be the same no matter which end of the tray is leading.

*Tray counting mechanism*

It is desirable to keep a supply of trays on the lower conveyor and to prevent the supply from falling below a certain number. It is also desirable to prevent overloading the conveyor. To this end, a counting mechanism is provided which will lock the gate levers 581 and 582 when more than a certain number of trays have accumulated on the conveyor.

As shown in Figs. 7 and 9, there is a second connecting bar 605 paralleling the bar 597 and connected to cranks fixed upon the shafts 588 and 591. On this bar 605 is mounted a pawl 606, which at each advance of the bar will move a ratchet wheel 607 counterclockwise (as viewed in Fig. 7) through an angle of one tooth spacing. The wheel 607 is normally urged clockwise by a spiral spring housed in a casing 608. An escapement 609 normally holds the wheel against turning clockwise. However, escapement is operable by a solenoid 610 to permit the ratchet wheel to turn clockwise through one tooth spacing at a time.

As described above, at each turn of the tray lifting cam 133, an electric circuit is closed through a pair of contact terminals 167 (Fig. 12). Said circuit includes the solenoid 610. Thus, while the ratchet wheel is advanced one tooth spacing for each tray that passes the gates 582, it is retracted an equal amount for each tray that enters the lifting mechanism. When the trays fed through the gates 582 exceed those lifted off the conveyor by a certain predetermined number, a pin 611 on the ratchet wheel will engage and lift a latch arm 612 into engagement with the finger 585, locking the forward gates 581 in closed position and preventing the passage of further trays therethrough until operation of the lifting mechanism actuates the solenoid 610 to turn the ratchet wheel back and withdraw the pin 611 from the latch arm 612.

A signal is provided to give warning when the number of trays on the lower conveyor falls below a predetermined minimum. The signal, as illustrated, consists of an electric lamp 615, which is lighted when said minimum is reached. The mechanism controlling the signal is illustrated in Fig. 17.

As described above, a number of double-armed gate levers 155 are provided along the lower conveyor to keep the trays properly spaced, there being enough gate levers to accommodate the maximum number of trays permissible on the conveyor. At a point along the tray course marking the predetermined minimum number of trays that should be maintained on the conveyor are two bell crank levers 616 and 617, one in advance of the other. The bell cranks are connected by a link 618 so that they will both swing together. The bell cranks carry pins 619 and 620 respectively, which are urged into the path of they trays by a spring 621. The pin 619 lies to the rear of the forward pin 156 of one gate lever 155, while the pin 620 lies in advance of the rear pin 157 of the next gate lever ahead. As the trays are carried forward by the conveyor, one tray must pass out of a pair of gate levers before another may enter. Thus, in Fig. 17, as the tray 60a is moving out of the gate levers, the pin 620, on clearing the tray, would swing inward were it not for the fact that the next tray 60b is pressing the pin 619 outward. By the time the tray 60b clears the pin 619, it will be holding the pin 620 out. Normally, then, the bell cranks are held in the position illustrated by successive trays, but should there be an interruption in the line of trays, i. e., no tray to hold out pin 619 when pin 620 was cleared, the bell cranks 616 and 617 would be swung rearward by the spring 621, and a switch blade 622 carried by, but insulated from, the bell crank 617 would bridge a pair of contact points 623, closing an electric circuit through the lamp 615, and thereby giving warning that more trays are to be immediately placed on the conveyor.

Electric circuits

The various electric circuits used in my automatic restaurant are illustrated in Fig. 43, and in this figure is also illustrated, somewhat diagrammatically, the control mechanism in the order station or cashier's cage.

An order key 625 in the order station is connected to a spring-pressed lever 626 to which is suitably attached one end of a link 630, the opposite end of which is freely carried by an arm 631 of a rotatably mounted bell crank. A depending arm 631a of said bell crank has fixed thereto a blade 626a, preferably insulated therefrom, and adapted to close, at the terminals 626b, a circuit in which are the tray release solenoid 182 and also two solenoids 627 and 628. The energizing of the solenoid 627 initiates the operation of the wheat cake machine substantially in the manner fully disclosed in my copending application Serial No. 268,659, filed April 9, 1928, while the latter, on its first actuation, initiates the preparing of a quantity of coffee and controls an accumulator mechanism thereon for starting a second quantity of coffee when a predetermined part of the first has been dispensed, all of which is fully explained in my copending application Serial No. 277,087, filed May 11, 1928. The solenoid 202 of the tray release at the wheat cake machine is in circuit with a switch lever 629 which is operated by the wheat cake machine after the wheat cakes have been delivered to the plate 61 on the tray.

The other electric circuits have already been described above in connection with the various mechanism they control and can readily be traced out without any further detailed explanation.

Connected to the arm 631 is a pivoted, spring-pressed device 631b, which, at each actuation of the key 625, is adapted to utter a token 211 from a token magazine 632. The token thus uttered slides down a chute 633 into a receptacle 634, where it will be accessible to the customer. Connected with the key 625 is a counter 635 so that at each depression of the key the counter will be operated, thus registering the number of sales made and providing a check on the cashier at the order station.

While I have described a preferred embodiment of my invention, it will be understood that my invention is not limited to the particular embodiment nor to the particular details of construction described, but I reserve the right to make such changes of construction and arrangements of parts as fall within the spirit and scope of the invention, all as more particularly pointed out in the claims.

I claim:

1. Commodity preparing and delivering mechanism, including commodity preparing devices, means for actuating said preparing devices, a plurality of receiving stations, an impulse receiving member for each of said stations, and commodity conveying apparatus for receiving prepared commodities from said devices in response to said actuation and delivering said commodities to said receiving stations in the order in which the impulse receiving members receive impulses.

2. Commodity preparing and delivering mechanism, including impulse receiving commodity preparing devices, means for giving to said devices an ordering impulse, said devices being operable on receiving such impulse to prepare a commodity for delivery, a plurality of receiving stations, a delivery impulse transmitting means at each of said stations, a delivery impulse receiving means for each of said receiving stations, and commodity conveying apparatus for receiving prepared commodities from said devices and delivering said commodities to said receiving stations in the order in which the delivery impulse receiving means receive delivery impulses.

3. Commodity preparing and delivering mechanism, including commodity preparing devices, a receiving station, and commodity handling apparatus for receiving a prepared commodity from said devices and delivering it to said receiving station, said apparatus including means operating later to remove from said receiving station so much of said commodity as has not otherwise been removed.

4. Commodity delivering mechanism, including commodity dispensing devices, a plurality of receiving stations, an impulse receiving member for each of said stations, and commodity handling apparatus for receiving commodities from said devices and delivering said commodities to said receiving stations in the order in which their impulse receiving members receive impulses, said apparatus including elements operating thereafter to remove from each of said receiving stations so much of the commodity delivered thereto as has not been otherwise removed.

5. Commodity preparing and delivering mechanism, including impulse receiving commodity preparing devices, means for giving to said devices an ordering impulse, said devices being operable on receiving such impulse to prepare a commodity for delivery, a plurality of receiving stations, a delivery impulse transmitting means for each of said receiving stations, delivery impulse receiving means, and commodity conveying apparatus for receiving prepared commodities from said devices and delivering said commodities to said receiving stations in the order in which the delivery impulse receiving means receives delivery impulses, said apparatus including elements operating thereafter to remove from each of said receiving stations so much of a commodity delivered thereto as has not been otherwise removed.

6. Commodity preparing and delivering mechanism, including impulse receiving commodity preparing devices operable upon receiving an ordering impulse to prepare a commodity for delivery, token ejecting means operating upon ejecting a token to give said devices an ordering impulse, a plurality of receiving stations, a token receiver for each of said stations, and commodity conveying apparatus for receiving from said devices prepared commodities and delivering them to said stations in the order in which their token receivers receive tokens.

7. Commodity preparing and delivering mechanism, including impulse receiving commodity preparing devices operable upon receiving an ordering impulse to prepare a commodity for delivery, token ejecting means operating upon ejecting a token to give said devices an ordering impulse, a plurality of receiving stations, a token receiver for each of said stations, and commodity conveying apparatus for receiving from said devices prepared commodities and delivering them to said stations in the order in which their token receivers receive tokens, said apparatus including elements operating thereafter to remove from each of said receiving stations so much of a commodity delivered thereto as has not otherwise been removed.

8. Commodity preparing and delivering mechanism, including commodity preparing devices, a receiving station including space for a customer, and commodity handling apparatus for receiving a prepared commodity from said devices and delivering it to said receiving station, said apparatus including elements operating thereafter to remove from said receiving station so much of the commodity delivered thereto as has not been removed by a customer, and said elements becoming operative by the departure of a customer from said space.

9. Commodity delivering mechanism comprising a receiving station including a commodity space and a recipient space, and commodity handling apparatus for delivering a commodity to said commodity space, said apparatus including elements operating thereafter to clear said commodity space, said elements becoming operative by the departure of a recipient from said recipient space.

10. Commodity delivering mechanism comprising a receiving station including a commodity space, and commodity handling apparatus for delivering a commodity to said space, said apparatus including elements releasable only after delivery of a commodity to said space to clear said space.

11. Commodity handling mechanism comprising a plurality of receiving stations, an impulse receiving means coordinating with said stations, said impulse receiving means being capable of receiving impulses more rapidly than commodities can be delivered to said stations, and commodity handling apparatus responsive to the received impulses for conveying commodities to said stations in accordance with said impulses.

12. Commodity handling mechanism comprising a plurality of receiving stations, an impulse receiving member for each of said stations, and commodity handling apparatus for conveying commodities to said stations in the order in which their impulse receiving members receive impulses, said apparatus including elements at each station operating after delivery of a commodity thereto for later removing therefrom so much of such commodity as has not otherwise been removed.

13. Article delivering mechanism including a receiving station, article handling apparatus including a conveyor for delivering articles to said station and including elements thereafter operable for returning articles there remaining to the conveyor, and safety devices controlling said elements and preventing operation thereof until there is room on said conveyor for said remaining articles.

14. Article delivering mechanism including a plurality of receiving stations, an impulse receiving member for each of said stations, article handling apparatus including a conveyor, control means for said apparatus causing it to deliver articles to said stations in the order in which their respective receiving members receive impulses, said apparatus including elements operating thereafter to return to the conveyor articles remaining at said stations, and safety devices controlling said elements and preventing operation thereof until there is room on said conveyor for said remaining articles.

15. An article delivering mechanism including a plurality of serving stations, a conveyor for transporting article carriers adjacent the serving spaces, a transfer means at each of said stations for conveying the carriers to and fro between the conveyor and the serving station, means for selectively actuating one of the transfer means to deliver a carrier from the conveyor to a serving space, and control means activated by the presence of an operator at said space after the carrier has been delivered thereto and automatically operated by departure of the operator from said space for actuating the transfer means to return the carrier to the conveyor.

16. A commodity delivering mechanism including a supply station, a conveyor returning therefrom and adapted to transport commodity carriers, a serving station comprising a plurality of serving spaces adjacent the conveyor, transfer means for selectively delivering the commodity carriers from the conveyor to the serving spaces and returning the carriers from said spaces to the conveyor, and means preventing operation of the transfer means to return a carrier to the conveyor while there is another carrier within a predetermined range of the carrier to be returned.

17. A commodity handling mechanism, including a supply station, a conveyor leading therefrom for transporting commodity carriers, serving stations disposed respectively on opposite sides of the conveyor transfer means for selectively delivering the carriers from the conveyor to the serving stations and for automatically returning the same to the conveyor, and means for preventing operation of the transfer means to return a carrier from one serving station while a carrier is being returned from an opposite serving space.

18. In a commodity dispensing system, a plurality of serving spaces, a token receiver for each of said spaces, a conveyor for conveying a plurality of commodities to the serving spaces, means controlled by the deposit of tokens in the token receivers for selectively controlling the delivery of the commodities to the serving spaces, means for retaining each deposited token in its receiver until the commodity has been delivered to the serving space associated therewith, a token receptacle, means controlled by the delivery of the commodity for delivering the token to the conveyor, and means for delivering the token from the conveyor into said receptacle.

19. Food preparing and delivering mechanism including devices for preparing food and delivering predetermined quantities thereof to a conveying apparatus, a token ejector operable on ejecting a token to start said devices in operation, a plurality of serving stations each including a token receiver, conveying apparatus inaccessible to customers for receiving food from said devices when prepared and delivering it to said serving stations, and an accumulator controlling said conveying apparatus and associated with said token receivers and causing said conveying apparatus to deliver food to said serving stations in the order in which ejected tokens are deposited in their respective token receivers.

20. Food preparing and delivering mechanism for restaurants including devices for cooking batter cakes and brewing coffee, other devices for containing butter, sugar, syrup and cream respectively, means for operating said devices respectively, to deliver a predetermined number of cooked batter cakes and predetermined quantities of coffee, butter, sugar, syrup and cream to a plurality of serving stations, and conveying apparatus for presenting successively a plurality of carriers in receiving relation to said devices and thereafter delivering said carriers to said serving stations.

21. Commodity handling mechanism including a commodity dispenser, conveying apparatus for presenting successively a plurality of carriers thereto in position to receive commodities therefrom, and means controlled with said dispenser for automatically halting said carriers to receive said supplies, and safety devices associated with said conveying apparatus and preventing delivery of carriers to said dispenser when there is not sufficient room to receive them.

22. Commodity handling mechanism including a commodity dispenser, a receiving station, conveying apparatus for presenting a carrier to said dispenser in position to receive a commodity therefrom and for thereafter delivering such carrier to said station, and safety devices preventing delivery of a carrier to said station without a commodity.

23. Commodity handling mechanism including a supply station, a serving station, a cleaning station, a conveyor for conveying carriers from the supply station to the serving station and from the serving station to the cleaning station, a second conveyor for returning carriers from the cleaning station to the supply station, means at the supply station for transferring the carriers from said second conveyor to the first conveyor, and means preventing transfer of the carriers from the second conveyor to the first conveyor when there is not sufficient room on the first conveyor to receive them.

24. Commodity handling mechanism including a supply station, a serving station, a cleaning station, a conveyor for conveying carriers from the supply station to the serving station and from the serving station to the cleaning station, a second conveyor for returning carriers from the cleaning station to the supply station, means at the supply station for transferring the carriers from said second conveyor to the first conveyor, means preventing transfer of the carriers from the second conveyor to the first conveyor when there is not sufficient room on the first conveyor to receive them and a signal actuated when the carriers on the second conveyor fall below a predetermined number.

25. Commodity handling mechanism including a supply station, a serving station, a cleaning station, a conveyor for conveying carriers from the supply station to the serving station and from the serving station to the cleaning station, a second conveyor for returning carriers from the cleaning station to the supply station, means at the supply station for transferring the carriers from said second conveyor to the first conveyor when there is room for them on the first conveyor, and means for preventing admission of carriers to the second conveyor when a predetermined number of carriers have been accumulated on said second conveyor.

26. Commodity handling mechanism including a supply station, a serving station, a cleaning station, a conveyor for conveying carriers from the supply station to the serving station and from the serving station to the cleaning station, a second conveyor for returning carriers from the cleaning station to the supply station, means at the supply station for transferring the carriers to the first conveyor, and means permitting admission of a carrier to the second conveyor only when a predetermined end of said carrier is presented to the conveyor.

27. In a commodity dispensing system, a plurality of carriers for commodities, each carrier being provided with a pair of fingers extensible from opposite sides thereof, a conveyor for said carriers, and means preventing admission of a carrier to the conveyor unless both of said fingers have been extended.

28. In a commodity dispensing system, a plurality of carriers for commodities, each carrier being provided with means adapted to be set to engage stops, a conveyor for said carriers, and means preventing admission of a carrier to said conveyor unless the stop engaging means have been properly set.

29. A commodity handling mechanism including a supply station, a plurality of serving stations, carriers for receiving commodities at the supply station, each carrier being provided with laterally projecting retractable fingers, a conveyor for conveying carriers from the supply station adjacent the serving stations, stops at each serving station, selective means for projecting the stops into the path of the projecting fingers whereby a carrier will be arrested at a selected serving station, delivery means controlled by engagement of the stops with the fingers for transferring the carrier from the conveyor to the serving station and for thereafter returning the carrier to the conveyor, and means co-operating with the delivery means for retracting said fingers.

30. Commodity handling mechanism including a commodity dispenser, a receiving station, apparatus for presenting a carried to said dispenser in position to receive a commodity therefrom and for thereafter delivering such carrier to said station, and safety devices preventing unauthorized removal of said carrier from said station.

31. Commodity handling mechanism including a plurality of receiving stations, a conveyor for bringing loaded carriers to said stations and conveying them away from said stations, apparatus at said stations associated with said conveyor for removing the carriers from the conveyor and replacing them thereon, and safety devices associated with said apparatus preventing a carrier that is being replaced on said conveyor from colliding with a carrier on said conveyor.

32. An article delivering mechanism including a serving station, a conveyor adjacent the serving station for transporting articles, and mechanism for delivering articles from the conveyor to the serving station for removal therefrom by a person and operable by the departure of such person from said serving station to remove therefrom all such articles delivered thereto as have not been otherwise removed.

33. An article delivering mechanism including impulse receiving means, a plurality of serving stations each having an impulse sending device associated with said receiving means, delivery apparatus for conveying articles to said stations, and routing mechanism controlled by said impulse receiving means for causing said delivery apparatus to deliver articles successively to said stations in the order in which their impulse sending devices are actuated.

34. Food preparing and delivering mechanism for restaurants, including devices for preparing various articles of food for delivery, means for operating each of said devices to cause the delivery of a predetermined quantity of said articles, a plurality of serving stations, and means including a conveying apparatus for presenting successively a plurality of carriers in receiving relation to said devices and thereafter delivering said carriers to said serving stations.

35. Commodity handling mechanism comprising a plurality of serving stations, an impulse delivering means for each of said stations, a receiver for said impulses, said receiver being capable of receiving impulses more rapidly than commodities can be delivered to said stations, and commodity handling apparatus controlled by said receiver for conveying commodities to said stations in the order in which the receiver receives impulses.

36. An article delivering mechanism including a serving station, a conveyor for transporting articles adjacent the serving station, means for removing selected articles from the conveyor and depositing them at the serving station for removal therefrom by a person, and means operable by the departure of such person from said serving station to remove therefrom all such articles delivered thereto as have not otherwise been removed.

37. A commodity delivering mechanism including a plurality of serving stations, a conveyor for transmitting commodity receptacles adjacent said stations, selective means for removing one of said receptacles from the conveyor, and depositing the same at a selected one of said stations in position accessible to a person there located, and means operable thereafter by the departure of such person for removing the receptacle from the station and depositing it on the conveyor.

38. A commodity delivering mechanism including commodity dispensing devices, a plurality of serving stations, impulse transmitting means at each of said stations, commodity conveying apparatus for receiving commodities from said devices and delivering said commodities to said serving stations, and a controller set by said impulses and determining the order of such delivery.

39. A commodity handling system comprising a food dispensing station in a position accessible to a customer, a serving station, a cleaning station, a conveyor for conveying food receptacles from the dispensing station to the serving station, and including means controlled by the departure of such customer for causing the conveyor to remove said receptacles to the cleaning station, and a separate conveyor for conveying the receptacle from the cleaning station to the dispensing station.

40. A commodity handling system, comprising a control station, a dispensing station, a plurality of serving stations, a cleaning station, a conveyor running from the dispensing station adjacent the serving stations to the cleaning station, said conveyor being adapted to convey food receptacles, means at the dispensing station for retaining the receptacles, means actuated from the control station for simultaneously releasing a receptacle at the dispensing station and issuing a token at the control station, a token depository at each of the serving stations and means actuated by depositing the token at any one of said serving stations for arresting the released receptacle at said serving station.

41. A commodity handling system, comprising a control station, a dispensing station, a plurality of serving stations, a cleaning station, a conveyor running from the dispensing station adjacent the serving stations to the cleaning station, said conveyor being adapted to convey food receptacles, means at the dispensing station for retaining the receptacles, means actuated from the control station for simultaneously releasing a receptacle at the dispensing station and issuing a token at the control station, a token depository at each of the serving stations and means actuated by depositing the token at any one of said serving stations for transferring said receptacles to said station, and means operating automatically to cause a subsequent return of said receptacle to the conveyor.

42. Commodity handling mechanism including a commodity dispenser, a receiving station, apparatus including a conveyor for presenting a carrier to said dispenser in position to receive a commodity therefrom and for thereafter conveying said carrier to a point adjacent said station, a conveyor housing preventing access to said conveyor, a gate in said housing at said station, and cooperating devices for opening said gate and removing said carrier from said conveyor to said station and thereafter closing said gate.

43. Commodity handling mechanism including a commodity dispenser, a receiving station, apparatus including a conveyor for presenting a carrier to said dispenser in position to receive a commodity therefrom and for thereafter conveying said carrier to a point adjacent said station, a conveyor housing preventing access to said conveyor, a gate in said housing at said station, and cooperating devices for opening said gate and removing said carrier to said station and thereafter closing said gate and for later opening said gate, replacing said carrier on the conveyor and closing said gate.

44. Food delivering mechanism including devices for dispensing food, token ejective means for initiating operation of said devices, a plurality of guest stations, conveying apparatus for receiving dispensed food and delivering it to said stations, and token actuated routing elements controlling said conveying apparatus.

45. An article delivering mechanism including a supply station, a serving station and a cleaning station and a conveyor for transporting articles adjacent the serving station and running from the supply station to the cleaning station, means for automatically selecting and removing articles from the conveyor and depositing them at the serving station, and means for subsequently removing said articles from the serving station and depositing them on the conveyor to be transported to the cleaning station.

46. A commodity delivering mechanism including a supply station, a cleaning station, and a plurality of serving stations intermediate between the supply station and the cleaning station, a conveyor for transporting commodity receptacles from the supply station adjacent the serving station and to the cleaning station, selective means for automatically selecting and removing one of said receptacles from the conveyor and depositing the same at a selected one of said serving stations, and means for subsequently removing the receptacle from the latter serving station and depositing it on the conveyor to be transported to the cleaning station.

47. A commodity delivering mechanism including a commodity dispensing device, a plurality of serving stations, and a commodity handling apparatus including a conveyor, for receiving commodities from said device and delivering the same to said serving stations, said apparatus also including means at each serving station operating automatically to cause subsequent removal from such serving station of so much of said commodity as has not otherwise been removed, said means being operable to cause such removal from one of said stations while said conveyor is delivering commodities from said dispensing device to other of said serving stations.

48. A commodity delivering mechanism including a commodity dispensing device, a plurality of serving stations, and a commodity handling apparatus including a conveyor, for receiving commodities from said device and delivering the same to said serving stations, said apparatus also including means at each serving station operating later to cause removal from said stations of so much of the commodity delivered thereto as has not otherwise been removed and to deposit the same on said conveyor, said means being operable to cause such removal from one of said stations while said conveyor is delivering commodities from said dispensing device to other of said serving stations.

49. A commodity delivering mechanism including a commodity dispensing device, a plurality of serving stations, and a commodity handling apparatus including a conveyor for receiving commodities from said device and delivering the same to said serving stations, said apparatus also including means at each serving station operating automatically to cause subsequent removal from such serving station of so much of said commodity as has not otherwise been removed, said means being operable to cause such removal from one of said stations while said conveyor is delivering commodities from said dispensing device to other of said serving stations, and means for preventing interference between articles being returned from a station and articles upon the conveyor.

50. A commodity delivering mechanism including a commodity dispensing device, a plurality of serving stations, and a commodity handling apparatus including a conveyor for receiving commodities from said device and delivering the same to said serving stations, said apparatus also including means at each serving station operating automatically to cause subsequent removal from such serving station of so much of said commodity as has not otherwise been removed, said means being operable to cause such removal from one of said stations while said conveyor is delivering commodities from said dispensing device to other of said serving stations, and means for preventing interference between articles being removed from the conveyor to a station and articles upon the conveyor.

51. In a commodity handling system including a conveyor, devices for dispensing commodities onto said conveyor, token ejection means for initiating operation of said devices, a plurality of serving stations adjacent said conveyor, a token depository at each station, and means actuated by depositing a token at any one of said stations for causing delivery of the commodities to that station.

HARRY RUSSELL BRAND.